United States Patent
Ye et al.

(10) Patent No.: US 12,160,879 B2
(45) Date of Patent: *Dec. 3, 2024

(54) SIDELINK TRANSPORT BLOCK SIZE CALCULATION SCHEME AND ASSOCIATED APPARATUSES, SYSTEMS, AND METHODS

(71) Applicant: APPLE INC., Cupertino, CA (US)

(72) Inventors: Chunxuan Ye, San Diego, CA (US); Dawei Zhang, Saratoga, CA (US); Oghenekome Oteri, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/069,568

(22) Filed: Dec. 21, 2022

(65) Prior Publication Data

US 2023/0132263 A1  Apr. 27, 2023

Related U.S. Application Data

(63) Continuation of application No. 17/215,162, filed on Mar. 29, 2021, now Pat. No. 11,564,227.

(60) Provisional application No. 63/007,300, filed on Apr. 8, 2020.

(51) Int. Cl.
| | |
|---|---|
| *H04W 72/02* | (2009.01) |
| *H04L 5/00* | (2006.01) |
| *H04W 72/12* | (2023.01) |
| *H04W 72/20* | (2023.01) |

(Continued)

(52) U.S. Cl.
CPC .......... *H04W 72/52* (2023.01); *H04L 5/0048* (2013.01); *H04W 72/12* (2013.01); *H04W 72/20* (2023.01)

(58) Field of Classification Search
None
See application file for complete search history.

(56) References Cited

U.S. PATENT DOCUMENTS

| | | |
|---|---|---|
| 2019/0306835 A1 | 10/2019 | Hoang et al. |
| 2020/0305126 A1 | 9/2020 | Li et al. |
| 2021/0385804 A1 | 12/2021 | Ye et al. |

(Continued)

FOREIGN PATENT DOCUMENTS

| | | |
|---|---|---|
| CN | 110351858 A | 10/2019 |
| CN | 110505703 A | 11/2019 |

(Continued)

OTHER PUBLICATIONS

U.S. Appl. No. 17/215,162, Corrected Notice of Allowability, Oct. 13, 2022, 3 pages.

(Continued)

*Primary Examiner* — Sai Aung
(74) *Attorney, Agent, or Firm* — Dorsey & Whitney LLP

(57) ABSTRACT

Apparatuses, systems, and methods may determine a transport block size using a number of resource elements for sidelink data. The number of resource elements for the sidelink data is calculated based at least on a reference second stage Sidelink Control Information (SCI) overhead. The reference second stage SCI overhead is calculated using the reference coding rate, the reference beta offset, the reference PSFCH symbol number, the alpha value, and the second stage SCI payload size.

17 Claims, 9 Drawing Sheets

(51) Int. Cl.
   *H04W 72/40* (2023.01)
   *H04W 72/52* (2023.01)

(56) References Cited

U.S. PATENT DOCUMENTS

| | | | |
|---|---|---|---|
| 2022/0132516 A1 | 4/2022 | Hwang et al. | |
| 2022/0140964 A1* | 5/2022 | Chen | H04L 5/0048 |
| | | | 370/330 |
| 2022/0159674 A1* | 5/2022 | Deng | H04W 72/566 |
| 2022/0191875 A1* | 6/2022 | Panteleev | H04L 5/0053 |
| 2022/0312401 A1 | 9/2022 | Zhang et al. | |
| 2022/0346079 A1* | 10/2022 | Yoshioka | H04W 72/20 |
| 2022/0353846 A1* | 11/2022 | Wang | H04W 72/0446 |
| 2022/0377724 A1* | 11/2022 | Yoshioka | H04L 5/0048 |

FOREIGN PATENT DOCUMENTS

| | | |
|---|---|---|
| WO | 2020033704 A1 | 2/2020 |
| WO | 2020033719 A1 | 2/2020 |

OTHER PUBLICATIONS

U.S. Appl. No. 17/215,162, Notice of Allowance, Sep. 23, 2022, 10 pages.
Huawei, Hisilicon, "Sidelink resource allocation mode 1", R1-1911883, 3GPP TSG RAN WG1 Meeting #99, Reno, Nevada, Agenda Item 7.2.4.2.1, Nov. 18-22, 2019, 24 pages.
Intel Corporation, "Summary#1 for AI 7.2.4.2.2 Mode-2 Resource Allocation", R1-1913232, 3GPP TSG RAN WG1 Meeting #99, Reno, Nevada, Agenda Item 7.2.4.2.2, Nov. 18-22, 2019, 40 pages.
MCC Support, "Final Report of 3GPP TSG RAN WG1 #99 v1.0.0", R1-2000151, 3GPP TSG RAN WG1 Meeting #100-e, e-Meeting, Reno, Nevada, Nov. 18-22, 2019, 163 pages.
NTT DoCoMo, Inc., "Sidelink physical layer structure for NR V2X", R1-1912880, 3GPP TSG RAN WG1 #99, Reno, Nevada, Agenda Item 7.2.4.1, Nov. 18-22, 2019, 16 pages.
LG Electronics, "Feature lead summary for AI 7.2.4.5 Physical layer procedures for sidelink", R1-1909475, 3GPP TSG RAN WG1 #98, Prague, CZ, Agenda Item 7.2.4.5, Aug. 26-30, 2019, 31 pages.
Intel Corporation, "Sidelink physical structure for NR V2X communication", R1-1912203, 3GPP TSG RAN WG1 Meeting #99, Reno, Nevada, Agenda Item 7.2.4.1, Nov. 18-22, 2019, 34 pages.

* cited by examiner

SIDELINK TRANSPORT BLOCK SIZE CALCULATION SCHEME AND ASSOCIATED APPARATUSES, SYSTEMS, AND METHODS

TECHNICAL FIELD

This application relates generally to wireless communication systems, and more specifically to sidelink communication.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
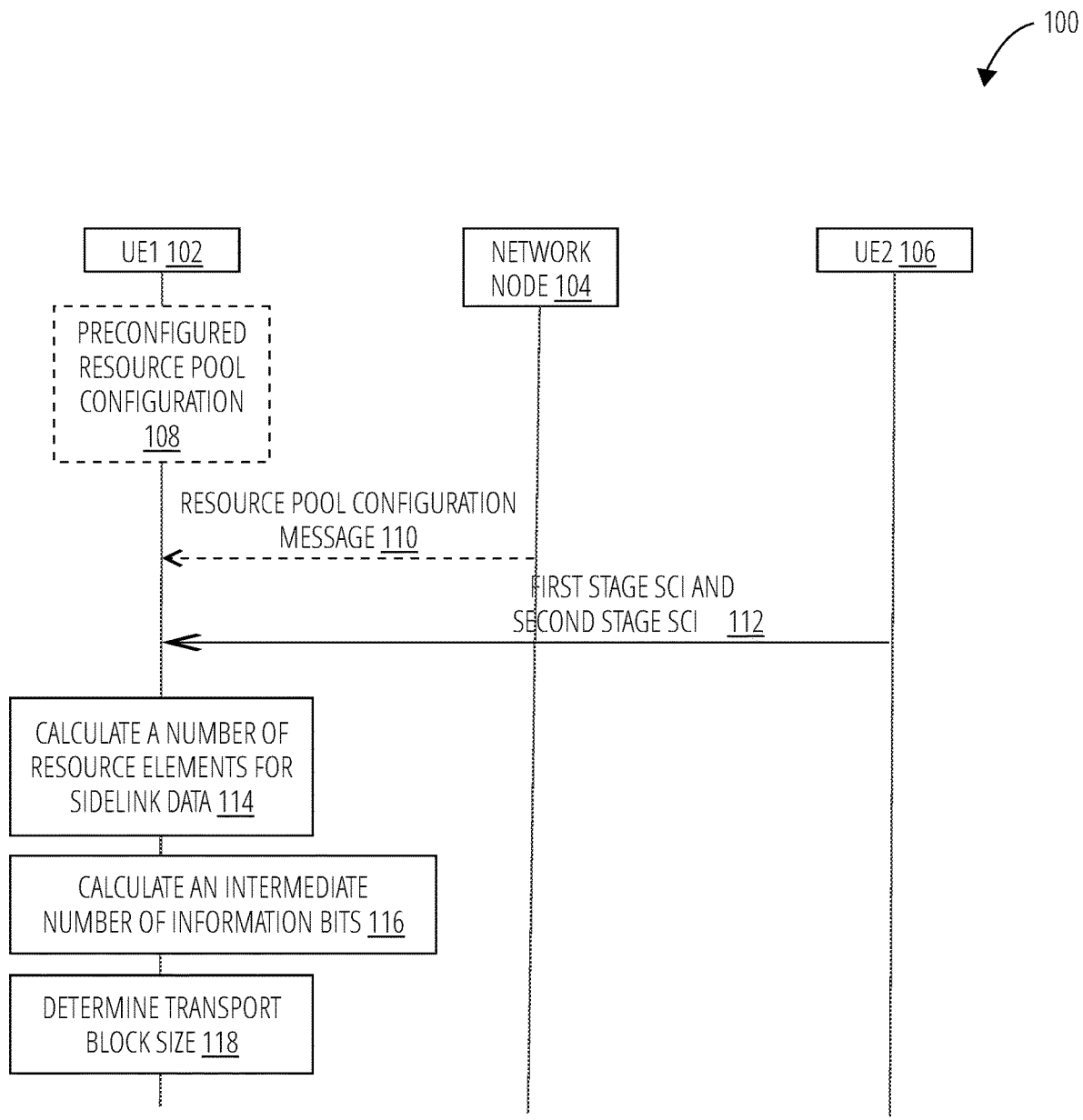
FIG. 1 is a simplified signal flow diagram of an example procedure for sidelink Transport Block Size (TBS) calculation in accordance with some embodiments.

In some embodiments, New radio (NR) vehicle-to-everything (V2X) supports 2-stage SCI. SCI stage 1 (SCI1) is carried on Physical Sidelink Control Channel (PSCCH). Polar code adopted for NR Downlink Control Information (DCI) is applied to PSCCH. Sidelink Control Information (SCI) stage 2 (SCI2) is carried on Physical Sidelink Shared Channel (PSSCH). Polar coding used for Physical Sidelink Downlink Channel (PDCCH) is applied to SCI stage 2.

Mapping of the second stage SCI may be accomplished using frequency-first mapping within the PSSCH. The resource elements s for the second stage SCI may not be interlaced with (localized in) PSSCH data resource elements. The second stage SCI may be mapped in frequency first with resource block granularity, and then mapped in the next symbol(s). For example, the mapping may be done by mapping to all resource blocks in the all sub-channels for the scheduled PSSCH in one symbol first before moving on the next symbol.

For modulation order of the second stage SCI, Quadrature (Quaternary) Phase Shift Keying (QPSK) may be used. When PSSCH is 2-layer, the same modulation symbol of the second stage SCI may be mapped to the two layers: X(0)(i)=d(0)(i), X(1)(i)=d(0)(i).

Part of second stage SCI mapping includes determining the number of coded bits. The determination of coded modulation symbols of HARQ-ACK with UL-SCH provides a baseline. For instance, the number of coded modulation symbols per layer for second SCI may be determined as follows.

$$Q'_{SCI2} = \min\left\{\left\lceil \frac{(O_{SCI2} + L_{SCI2})\beta_{offset}^{SCI2} \sum_{l=0}^{N_{symbol}^{PSSCH}-1} M_{SC}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{SC}^{SCI2}(l) \right\rceil\right\} + \gamma$$

Where:

$O_{SCI2}$ is the number of the 2nd SCI bits;

$L_{SCI2}$ is the number of Cyclic Redundancy Check (CRC) bits for 2nd SCI, which is 24 bits;

$\beta_{offset}^{SCI2}$ is indicated by the corresponding 1st SCI;

$\alpha$ (alpha value) is a value that is preconfigured or configured per resource pool;

$N_{symbol}^{PSSCH}$ is the number of allocated symbols for the PSSCH except AGC symbol;

$M_{SC}^{SCI2}(l)$ is the number of REs that can be used for transmission of the 2nd SCI;

$\gamma$ is determined to ensure that there is no remaining RE in the RB having the last coded symbol of the SCI2 after mapping the SCI2;

$K_r$ is the r-th code block size for SL-SCH of the PSSCH transmission;

$C_{SL\text{-}SCH}$ is the number of code blocks for SL-SCH of the PSSCH transmission.

Part of the second stage SCI mapping calculation includes determining sidelink transport block size (TBS). In other words, the formula to calculate the number of coded modulation symbols per layer for second stage SCI depends on sidelink TBS. If the same formula as is used in an NR UCI transmissions on PUSCH was used to calculate the second stage SCI overhead for sidelink TBS, then a cyclic dependency between TBS calculation and the calculation of number of resource elements for second stage SCI.

In some embodiments, for sidelink TBS determination, the intermediate number of information bits and the number of resource elements for sidelink data are calculated based on the following considerations. For the number of PSSCH symbols, Automatic Gain Control (AGC) symbol and guard period (GP) symbol in the end of slot are excluded. For PSCCH overhead, the exact number of resource elements for PSCCH (including PSCCH DMRS) is considered. Second stage SCI overhead also needs to be considered. In some embodiments, a UE is not expected to receive a retransmission with a TBS that is different from the last valid TBS signaled for the TB. For example, the design may be such that the TBS is the same between a transmission and its re-transmission(s). Additionally, SCI overhead, Physical Sidelink Feedback Channel (PSFCH), PSSCH DMRS, and GP symbols may be considered for sidelink TBS.

Currently however, it is unclear how to handle the relationship between PSSCH TBS determination and second stage SCI modulation determination. This is because calculating coded modulation symbols of second stage SCI according to the above equation depends on sidelink TBS. To handle the relationship of sidelink TBS and calculating coded modulation symbols of second stage SCI, it would be beneficial to determine a method to calculate overhead of second stage SCI, PSFCH, PSSCH DMRS, GP symbols before receiving PSFCH, sidelink (SL) Phase-tracking reference signal (PT-RS), and SL Channel-State Information Reference Signal (CSI-RS).

Embodiments herein describe systems, apparatuses, and methods for calculating the overhead of second stage SCI, PSFCH, GP symbols before receiving PSFCH, PSSCH DMRS, PT-RS and CSI-RS to determine sidelink TBS. Additionally, some embodiments describe how to handle a situation where modulation and coding scheme (MCS) changes between initial transmission and retransmission(s).

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a simplified signal flow diagram 100 of an example procedure for sidelink TBS calculation in accordance with some embodiments. In some embodiments, a UE (e.g., UE1 102) may receive resource pool configuration information and a first stage SCI 112. In some embodiments, a second stage SCI may also be received together with the first stage SCI 112. The contents of the second stage SCI are used by the UE1 102 to determine the cast-type. The UE1 102 may use the received information to determine 118 transport block size.

As shown, in some embodiments, the UE1 102 may be have a preconfigured resource pool configuration 108. The preconfigured resource pool configuration 108 may include one or more of a reference coding rate, a reference modulation order, a reference beta offset, a reference CSI-RS port number, a reference PSFCH symbol number, and an alpha value.

In some embodiments, the UE1 102 may receive a resource pool configuration message 110 transmitted by a network node 104. The resource pool configuration message 110 may comprise one or more of a reference coding rate, a reference modulation order, a reference beta offset, a reference CSI-RS port number, a reference PSFCH symbol number, and an alpha value.

The preconfigured resource pool configuration 108 and the resource pool configuration message 110 may be used individually or in combination. In some embodiments, the preconfigured resource pool configuration 108 is used by the UE1 102 for each of a reference beta offset, a reference CSI-RS port number, a reference PSFCH symbol number, and an alpha value. In other embodiments, the resource pool configuration message 110 is used for each of a reference beta offset, a reference CSI-RS port number, a reference PSFCH symbol number, and an alpha value. In yet other embodiments some elements may be included in the preconfigured resource pool configuration 108 while other elements are included in the resource pool configuration message 110.

A second UE (i.e., UE2 106) may transmit a first stage SCI 112. The UE1 102 may receive the first stage SCI 112 which may indicate a second stage SCI payload size. Thus, the UE1 102 may identify the second stage SCI payload size using the first stage SCI 112.

The UE1 102 may calculate 114 a number of resource elements for sidelink data using the elements included in the preconfigured resource pool configuration 108 and/or the resource pool configuration message 110. FIGS. 2-5 provide flow charts illustrating a method that may be performed by the UE1 102 to calculate 114 a number of resource elements for sidelink data (e.g., a PSSCH).

Figure 6:
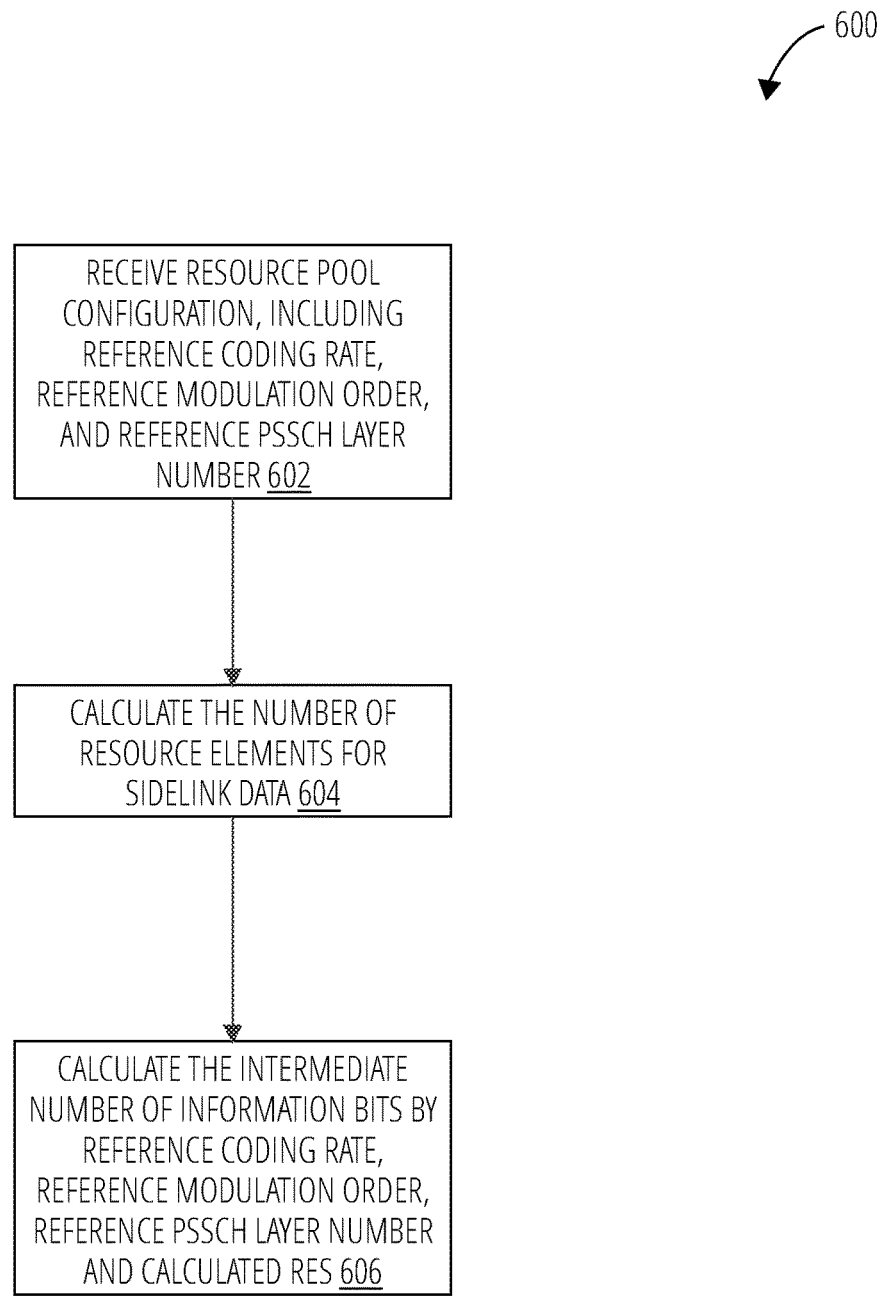
FIG. 6 is a flow chart illustrating a method for calculating an intermediate number of information bits.

The UE1 102 may further calculate 116 an intermediate number of information bits. The UE1 102 may use the number of resource elements for the for sidelink data to calculate 116 the intermediate number of information bits. FIG. 6 provides a flow chart illustrating a method that may be performed by the UE1 102 for calculating the intermediate number of information bits.

The UE1 102 can determine 118 the transport block size using the intermediate number of information bits. The TBS is determined by a formula or a look-up table. The selection from formula or look-up table is based on intermediate number of information bits. Specifically, in some embodiments, if the intermediate number is larger than 3824, then TBS is calculated by formula, otherwise, TBS is obtained from a look-up table. For instance, in some embodiments the procedure steps 2), 3) and 4) in Section 5.1.3.2 of TS38.214 are reused.

Figure 2:
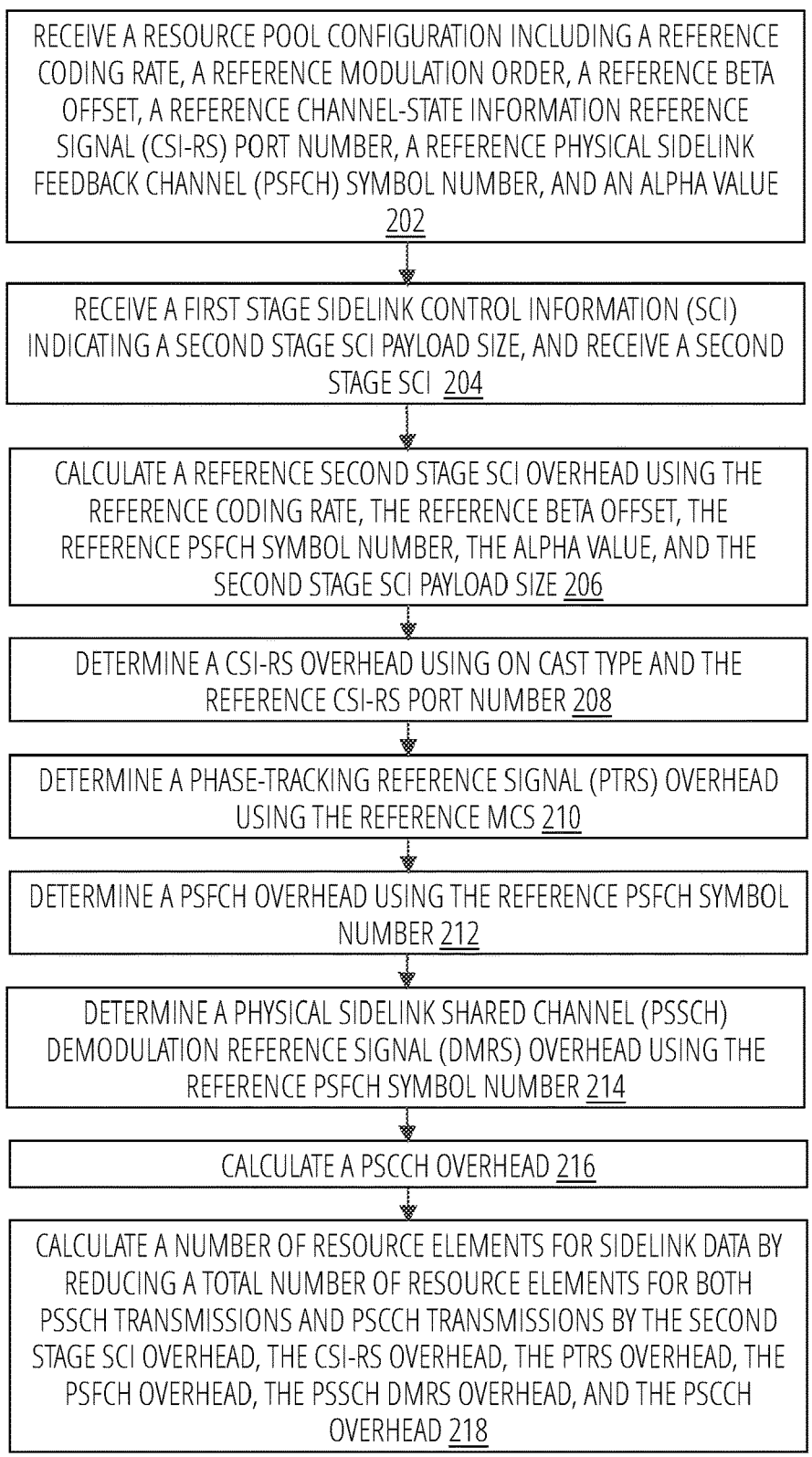
FIG. 2 is a flow chart illustrating a method for calculating the number of resource elements for sidelink data.

FIG. 2 is a flow chart illustrating a method 200 for calculating the number of resource elements for sidelink data. This method 200 may be performed by a UE to determine the number of resource elements for sidelink data.

In block 202, the method 200 receives a resource pool configuration including a reference coding rate, a reference modulation order, a reference beta offset, a reference CSI-RS port number, a reference PSFCH symbol number, and an alpha value. The UE1 may determine a reference modulation coding scheme (MCS), with the included reference coding rate and a reference modulation order. The resource pool configuration may be preconfigured or sent and configured via a message from a network node. For example, the resource pool configuration may be sent via an RRC message. In block 204, the method 200 receives a first stage SCI indicating a second stage SCI payload size, and receives a second stage SCI.

Figure 3:
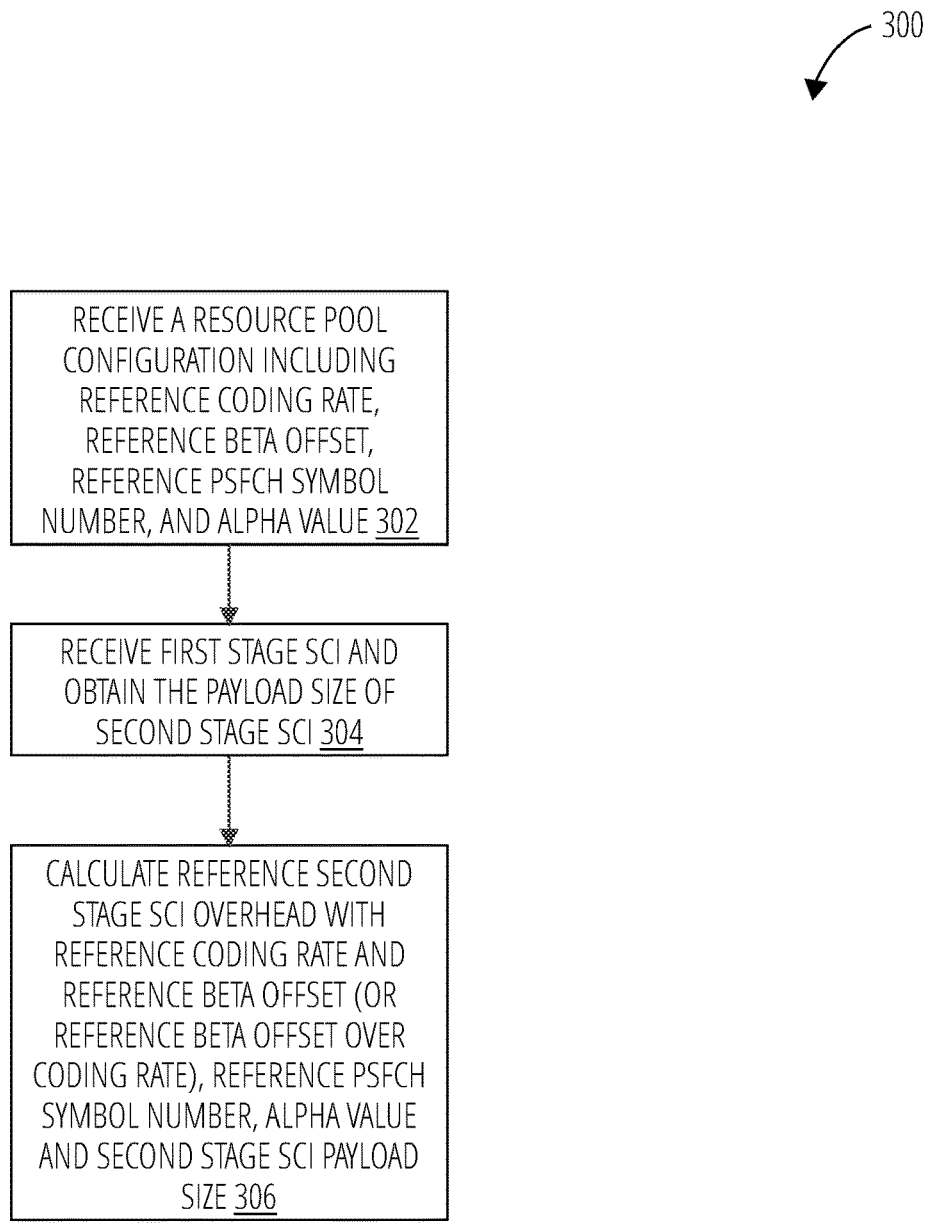
FIG. 3 is a flow chart illustrating a method for calculating a second stage Sidelink Control Information (SCI) overhead in accordance with some embodiments.

In block 206, the method 200 calculates a reference second stage SCI overhead using the reference coding rate, the reference beta offset, the reference PSFCH symbol number, the alpha value, and the second stage SCI payload size. FIG. 3 provides additional details regarding how the reference second stage SCI overhead is calculated by a UE. As described in FIG. 3, a new formula is used to calculate second stage SCI overhead for sidelink TBS, where the formula does not rely on sidelink TBS. The formula is based on reference parameters which are preconfigured per resource pool or configured via a message from a network node per resource pool, so that the same parameters are used for both initial transmission and retransmission(s).

Figure 4:
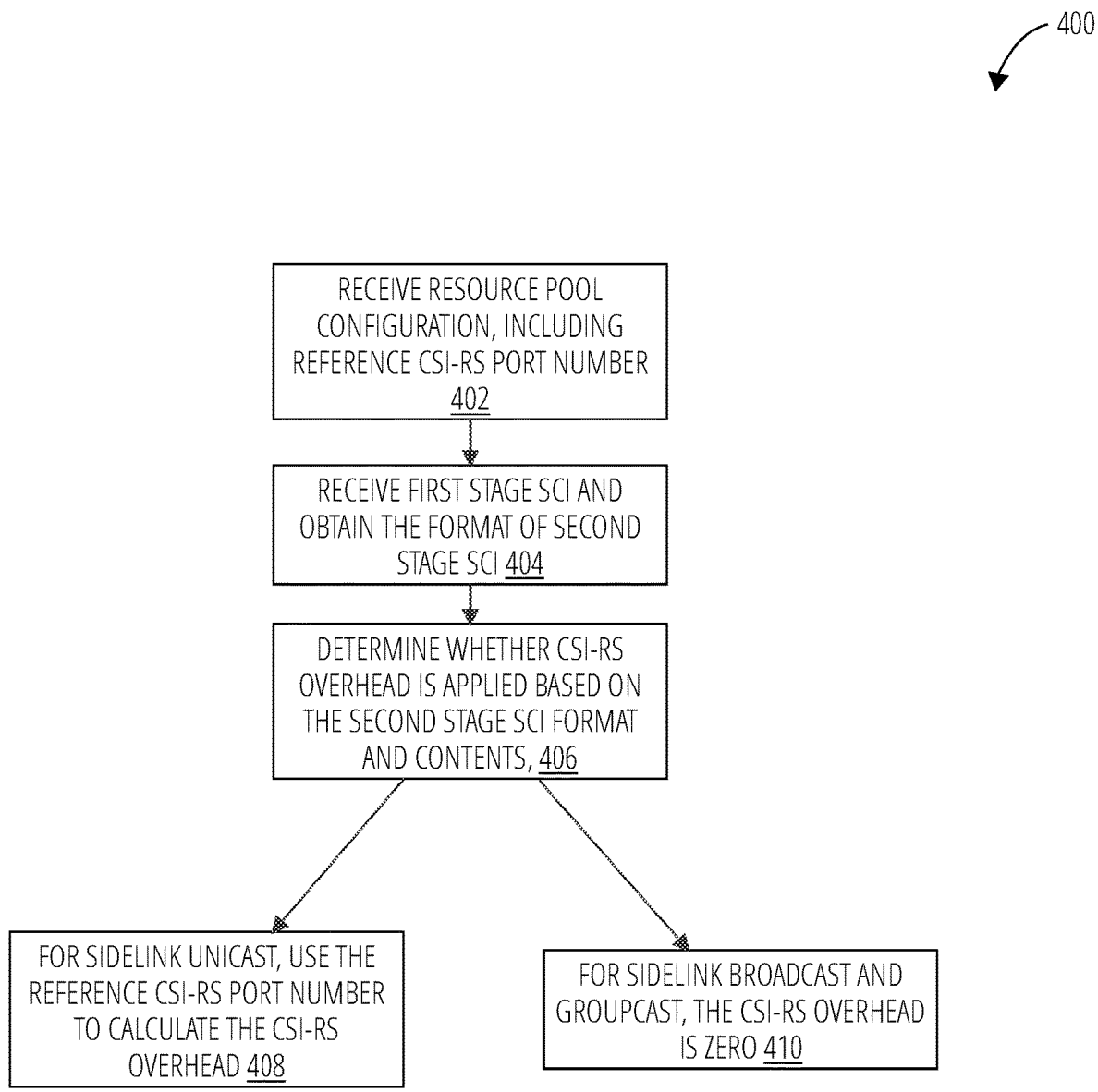
FIG. 4 is a flow chart illustrating a method for calculating Channel-State Information Reference Signal (CSI-RS) overhead in accordance with some embodiments.

In block 208, the method 200 determines a CSI-RS overhead using on cast type and the reference CSI-RS port number. To determine the CSI-RS overhead, a UE may obtain a format of the second stage SCI from the first stage SCI and obtain the sidelink type-cast information from the second stage SCI contents. In some embodiments, for sidelink broadcast and groupcast, the CSI-RS overhead is zero, and for sidelink unicast the CSI-RS overhead depends on the reference CSI-RS port number. In such embodiments, the sidelink CSI-RS only exists for sidelink unicast. Hence, the sidelink CSI-RS overhead would only be counted for sidelink unicast. The dependence between the CSI-RS overhead and the reference CSI-RS port number may be described in a function. For example, the CSI-RS overhead may be a function of the number of ports for sidelink unicast. For example, the CSI-RS overhead may be doubled if reference CSI-RS port number is reduced from 2 to 1. Note that CSI-RS port number is either 1 or 2. FIG. 4 provides additional details regarding how the CSI-RS overhead is calculated by a UE.

In block 210, the method 200 determines a phase-tracking reference signal (PTRS) overhead using the reference MCS. The time density of sidelink PTRS depends on the MCS indicated in the first stage SCI and the frequency density of sidelink PTRS depends on scheduled bandwidth of PSSCH. The PTRS overhead is the total number of resource elements allocated for PT-RS transmissions. In some embodiments, the time density of PT-RS depends on the reference MCS that is preconfigured per resource pool or reconfigured by a message such as a PC5-RRC. The reference MCS is any one (e.g., minimum/maximum/medium) from the supported modulation from preconfigured MCS range of resource pool configuration. In some embodiments, the time density of PT-RS depends the scheduled MCS as indicated in first stage SCI, if the MCS is not allowed to change between initial transmission and retransmission(s). Depends, herein, refers to that a parameter is a function of another parameter, or that a parameter is used in a look up table.

In some embodiments, time density of PT-RS may also be directly preconfigured or configured via configuration message per resource pool. It may be assumed the frequency density of PT-RS does not change between initial transmission and retransmissions. The PTRS overhead may depend on carrier frequency. For example, the PTRS overhead may only appear in FR2, and the PTRS overhead in FR1 is 0. In some embodiments, sidelink CSI-RS and sidelink PTRS overhead may be covered by a single RRC parameter (e.g., "xoverhead"), in terms of number of REs per sub-channel.

In block 212, the method 200 determines a PSFCH overhead using the reference PSFCH symbol number. The GP symbol before PSFCH may be associated with PSFCH. Hence, it is rational to combine the overhead of GP symbols before PSFCH with the overhead of PSFCH. In a resource pool preconfiguration or configuration message, the PSFCH periodicity is either of 0, 1, 2 and 4 slots. For the case of PSFCH periodicity being 0 slot, there is no PSFCH resource configured and hence no PSFCH overhead should be counted in the sidelink TBS calculation. For the case of PSFCH periodicity being 1 slot, PSFCH resources exist in every sidelink slot. Here, the number of PSFCH symbols is counted as 3 in the overhead calculation, including a GP symbol before PSFCH and second PSFCH symbols.

For the case of PSFCH periodicity being 2 or 4 slots, PSFCH resources may or may not exist in a sidelink slot. It is possible that an initial transmission occurs in a slot with PSFCH resources while retransmission(s) occur in a slot without PSFCH resources, or vice versa. To align the TBS calculation between initial transmission and retransmission(s), a configured (either preconfigured or via a resource pool configuration message) reference PSFCH symbol number should be used for the PSFCH overhead calculation. The reference PSFCH symbol number should be between 0 and 3, and configuration is per PSFCH periodicity (i.e., 2 or 4 slots) per resource pool. Overall, the number of REs for PSFCH and GP symbols before PSFCH is:

$$N_{RE}^{PSFCH} = N_{SC}^{RB} * N_{RB}^{subchannel} * N_{subchannel}^{PSSCH} * N_{symbol}^{PSFCH}$$

where:
$N_{RE}^{PSFCH}$ is the total number REs allocated for PSFCH transmissions;
$N_{symbol}^{PSFCH}$ is the number of PSFCH symbols;
$N_{SC}^{RB}$ is the number of sub-carriers per resource block (RB). In some embodiments, it is a constant of 12;
$N_{RB}^{subchannel}$ is the number RBs per sub-channel. This is based on resource pool (pre)configuration;
$N_{subchannel}^{PSSCH}$ is the number of sub-channels per PSSCH. This is indicated in the first stage SCI.
The number of PSFCH symbols $N_{symbol}^{PSFCH}$ depends on PSFCH periodicity based on configuration of resource pool (preconfigured or configured via configuration message). A GP symbol before PSFCH may be counted as PSFCH overhead. If PSFCH periodicity is 1 slot, $N_{symbol}^{PSFCH}=3$. If PSFCH periodicity is 0 slot, $N_{symbol}^{PSFCH}=0$. If PSFCH periodicity is 2 or 4 slots, $N_{symbol}^{PSFCH}$ is configured or preconfigured by resource pool or pre-defined. In some embodiments, $0 \leq N_{symbol}^{PSFCH}(period4) \leq N_{symbol}^{PSFCH}(period2) \leq 3$. $N_{symbol}^{PSFCH}(period4)$ is the number of PSFCH symbols if (pre)configured PSFCH periodicity is 4 slots. $N_{symbol}^{PSFCH}(period2)$ is the number of PSFCH symbols if (pre)configured PSFCH periodicity of 4 slots. For example, $N_{symbol}^{PSFCH}(period4)=1$ and $N_{symbol}^{PSFCH}(period2)=2$.

Figure 5:
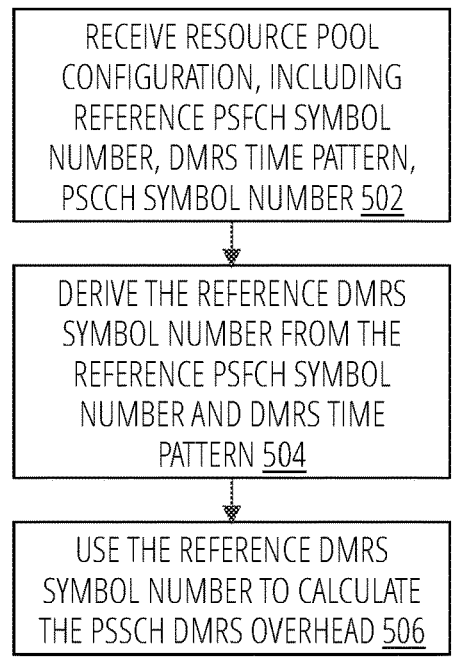
FIG. 5 is a flow chart illustrating a method for calculating Physical Sidelink Shared Channel (PSSCH) Demodulation Reference Signal (DMRS) overhead in accordance with some embodiments.

In block 214, the method 200 determines a physical sidelink shared channel (PSSCH) demodulation reference signal (DMRS) overhead using the reference PSFCH symbol number. FIG. 5 provides additional details regarding how the PSSCH DMRS overhead is calculated by a UE.

In block 216, the method 200 calculates a PSCCH overhead. PSCCH overhead is the total number of resource elements allocated for PSCCH. The PSCCH overhead may be calculated as follows.

$$N_{RE}^{PSCCH} = N_{RB}^{PSCCH} * N_{SC}^{RB} * N_{symbol}^{PSCCH}$$

where:

$N_{RB}^{PSCCH}$ is configured or preconfigured by resource pool on the number of resource blocks of PSCCH $N_{symbol}^{PSCCH}$ is configured or preconfigured by resource pool on the number of symbols of PSCCH $N_{SC}^{RB}$ is the number of sub-carriers per resource block (RB). In some embodiments, it is a constant of 12.

In block 218, method 200 calculates a number of resource elements for sidelink data by reducing a total number of resource elements for both PSSCH transmissions and PSCCH transmissions by the second stage SCI overhead, the CSI-RS overhead, the PTRS overhead, the PSFCH overhead, the PSSCH DMRS overhead, and the PSCCH overhead. In other words, the number of REs allocated for sidelink data is given by:

$$N_{RE} = N_{RE}^{PSCCH/PSSCH} - N_{RE}^{PSCCH} - N_{RE}^{SCI2} - N_{RE}^{PSFCH} - N_{RE}^{PSSCH-DMRS} - N_{RE}^{PTRS} - N_{RE}^{CSI-RS}$$

where:

$N_{RE}^{PSCCH/PSSCH}$ is the total number REs allocated for PSCCH/PSSCH transmissions;

$N_{RE}^{PSCCH}$ is the PSCCH overhead;

$N_{RE}^{SCI2}$ is the second stage SCI overhead;

$N_{RE}^{PSFCH}$ is the PSFCH overhead;

$N_{RE}^{PSSCH-DMRS}$ is the PSSCH DMRS overhead;

$N_{RE}^{PTRS}$ is the PTRS overhead;

$N_{RE}^{CSI-RS}$ is the CSI-RS overhead.

The total number REs allocated for PSCCH/PSSCH transmissions may be determined by calculating:

$$N_{RE}^{PSCCH/PSSCH} = N_{SC}^{RB} * N_{RB}^{subchannel} * N_{subchannel}^{PSSCH} * N_{symbol}^{PSSCH}$$

where:

$N_{SC}^{RB}=12$ is the number of resource elements (or subchannels) per resource block;

$N_{RB}^{subchannel}$ is the number of resource blocks per subchannel, which is configured or preconfigured per resource pool;

$N_{subchannel}^{PSSCH}$ is the number of sub-channels of PSCCH/PSSCH (this value is the same between initial transmission and retransmissions);

$N_{symbol}^{PSSCH}$ is the number of symbols used for sidelink in a slot, excluding AGC symbol and GP symbol at the end of slot, and $5 \leq N_{symbol}^{PSSCH} \leq 12$. If the number of SL symbols varies with SL logical slot, then the maximum allowed SL symbols of SL logical slot is used for $N_{symbol}^{PSSCH}$, or "lengthSLsymbols-2" is used where "lengthSLsymbols" is in sidelink BWP configuration.

FIG. 3 is a flow chart illustrating a method 300 for calculating a reference second stage SCI overhead in accordance with some embodiments. The reference second stage SCI overhead is calculated by solving a reference second stage SCI formula.

To solve the reference second stage SCI formula, a few parameters are received. The UE receives 302 a resource pool configuration comprising a reference coding rate, a reference beta offset, a reference PSFCH symbol number, and an alpha value. The resource pool configuration may be received either through a preconfiguration (e.g., configured during manufacturing or programming) or through a configuration message from a network node. The UE also receives 304 a first stage SCI and obtains the payload size of the second stage SCI from the received first stage SCI.

The UE calculates 306 the reference second stage SCI overhead with reference coding rate and reference beta offset (or reference beta offset over coding rate), reference PSFCH symbol number, alpha value, and second stage SCI payload size using the reference second stage SCI formula. The reference second stage SCI formula does not rely on sidelink TBS. The formula is based on the previously mentioned reference parameters which are configured via a message or preconfigured per resource pool, so that the same scaling factor is used for both initial transmission and retransmission(s). The reference second stage SCI formula to calculate reference second stage SCI overhead is:

$$N_{RE}^{SCI2} = \min\left\{\left\lceil\frac{(O_{SCI2} + L_{SCI2})\beta_{offset}^{SCI2}}{R*Q_m}\right\rceil, \left\lceil\alpha \sum_{l=0}^{N_{symbol}^{SCI-2}-1} M_{SC}^{SCI2}(l)\right\rceil\right\} + \gamma$$

where:

$O_{SCI2}$ is the payload size of a second stage SCI format, which is indicated by first stage SCI. Initial transmission and retransmission(s) use the same second stage SCI format, i.e., constant $O_{SCI2}$;

$L_{SCI2}$ is the CRC length of second stage SCI format (e.g., $L_{SCI2}=24$).

R is either of the following two options:

1: Reference coding rate (pre)configured by resource pool or reconfigured by PC5-RRC. The reference coding rate may be any one (e.g., minimum/maximum/medium) in the supported coding rate from (pre)configured MCS range of resource pool configuration.

2: Scheduled target coding rate, as indicated in first stage SCI. This assumes the MCS indicated in first stage SCI is remained same between initial Tx and retransmission(s).

$Q_m=2$ is the modulation order of second stage SCI

α (i.e., alpha value) is preconfigured or configured scaling value per resource pool $N_{symbol}^{SCI-2}$ is the number of symbols for potential SCI stage 2 transmissions. This parameter depends on the configured reference PSFCH symbol number, i.e., $N_{symbol}^{SCI-2} = N_{symbol}^{PSSCH} - N_{symbol}^{PSFCH}$ $M_{SC}^{SCI2}(l)$ is the scheduled bandwidth of PSSCH transmission, expressed as a number of subcarriers $$\left\lceil \alpha \sum_{l=0}^{N_{symbol}^{SCI-2}-1} M_{SC}^{SCI2}(l) \right\rceil$$

may not be needed. A proper selection of reference R and $Q_m$ for any second stage SCI format ensures this item is always larger than the first item in the formula γ may not be needed. γ is to ensure the second stage SCI occupy integer number of resource blocks. Resource block level of accuracy may not be needed in calculating reference second stage SCI resources $\beta_{offset}^{SCI2}$ is the reference beta offset for second stage SCI per resource pool. The use of reference beta offset in second stage SCI overhead calculation allows the dynamic beta offset indicated in first stage SCI to be different in initial transmission and retransmission(s).

The reference beta offset for second stage SCI may be determined in a number of ways. In some embodiments, the reference beta offset for second stage SCI is obtained in first stage SCI and the same beta offset value in initial transmission and retransmission(s) is used. In some embodiments, reference beta offset is configured by resource pool or reconfigured by PC5-RRC. Reference beta offset may be any one (e.g., minimum/maximum/medium) from the (pre)configured set in resource pool configuration. In some embodiments, the Reference beta offset over coding rating ($\beta_{offset}^{SCI2}/R$) or reference coding rate over beta offset ($R/\beta_{offset}^{SCI2}$) is used.

Since it is expected the second stage SCI format (and hence, second stage SCI payload size) does not change between initial transmission and retransmission(s), the second stage SCI overhead calculated from the reference second stage SCI formula is always the same across transmissions and retransmissions.

FIG. 4 is a flow chart illustrating a method 400 for calculating CSI-RS overhead in accordance with some embodiments. A UE receives 402 a resource pool configuration. The resource pool configuration includes the reference CSI-RS port number. The UE receives 404 a first stage SCI and obtains the format of the second stage SCI from the first stage SCI. The format of the second stage SCI includes whether the sidelink is broadcast, groupcast, or unicast.

The UE determines 406, based on the format of the second stage SCI and the contents of the second stage SCI, whether CSI-RS overhead is applied. The contents of the second stage SCI indicates the cast-type, i.e., groupcast, unicast or broadcast. The existence of CSI-RS overhead depends on cast-type. For sidelink broadcast and groupcast, the UE determines 410 CSI-RS overhead is zero, $N_{RE}^{CSI-RS}=0$. For sidelink unicast, CSI-RS overhead depends on preconfigured or configured reference number of ports (either 1 or 2) for CSI-RS. The UE calculates 408 the CSI-RS overhead using the CSI-RS port number. For example, the CSI-RS overhead is doubled if reference CSI-RS port number reduced from 2 to 1. Note that CSI-RS port number is either 1 or 2.

FIG. 5 is a flow chart illustrating a method 500 for calculating PSSCH DMRS overhead in accordance with some embodiments. PSSCH DMRS overhead is the total number resource elements allocated for PSSCH DMRS transmissions. A UE performing the method 500 receives 502 resource pool configuration or resource pool preconfiguration, including reference PSFCH symbol number, DMRS time pattern, and PSCCH symbol number.

The UE derives 504 the reference DMRS symbol number from the reference PSFCH symbol number and the DMRS time pattern, and uses 506 the DMRS symbol number to calculate the PSSCH DMRS overhead.

In embodiments where DMRS configuration type 1 is used for frequency domain PSSCH DMRS, the number of resource elements for PSSCH DMRS only depends on the PSSCH DMRS time domain pattern. The PSSCH DMRS time domain pattern is dynamically adjusted and signaled in the first stage SCI, hence the actual number of PSSCH DMRS resource elements can change between initial transmission and retransmission(s). Overall, the number of resource elements for PSSCH DMRS can be calculated by $$N_{RE}^{PSSCH-DMRS} = \sum_{i=0}^{N_{symbol}^{PSSCH-DMRS}} N_{RE}^{PSSCH-DMRS}(i),$$

where $N_{symbol}^{PSSCH-DMRS}$ is the number of PSSCH DMRS symbols and $N_{RE}^{PSCCH-DMRS}(i)$ is the number of REs that can be used for PSSCH DMRS. To align the TBS calculation from initial transmission and retransmission(s). $N_{RE}^{PSSCH-DMRS}(i)$ is the number of REs for the i-th PSSCH DMRS symbol. This calculation is based on (pre)configured PSCCH frequency resource size, subchannel size, and $N_{subchannel}^{PSSCH}$.

In some embodiments, $N_{symbol}^{PSSCH-DMRS}$ is preconfigured or configured per resource pool. Further, $N_{symbol}^{PSSCH-DMRS}$ can be selected from the preconfigured or configured set of PSSCH DMRS time domain patterns, where the selection depends on $N_{symbol}^{PSSCH}$. For example, if $N_{symbol}^{PSSCH}=0$, then $N_{symbol}^{PSSCH-DMRS}$ is the largest in the (pre)configured (i.e., preconfigured or configured) set of PSSCH DMRS time domain patterns. If $N_{symbol}^{PSSCH}=3$, then $N_{symbol}^{PSSCH}=3$ is the smallest in the (pre)configured set of PSSCH DMRS time domain patterns. $N_{symbol}^{PSSCH}=1$ or 2 implies $N_{symbol}^{PSSCH-DMRS}$ equal to the medium of configured PSSCH DMRS time pattern.

FIG. 6 is a flow chart illustrating a method 600 for calculating an intermediate number of information bits. A UE performing the method 600 receives 602 resource pool configuration or resource pool preconfiguration, including reference coding rate, reference modulation order, and reference PSSCH layer. The UE calculates 604 the number of resource elements for sidelink data by reducing a total number of resource elements for both PSSCH transmissions and PSCCH transmissions by the second stage SCI overhead, the CSI-RS overhead, the PTRS overhead, the PSFCH overhead, the PSSCH DMRS overhead, and the PSCCH overhead as discussed with reference to FIG. 2.

The UE further calculates 606 the intermediate number of information bits by reference coding rate, reference modulation order, reference PSSCH layer number and calculated resource elements. The intermediate number of information bits may be calculated as:

$$N_{info} = N_{RE} \cdot R \cdot Q_m \cdot v$$

where $N_{RE}$ is the number of resource elements for PSSCH, R, $Q_m$, and v may be determined as follows In some embodiments, if the scheduled MCS and PSSCH layer number, as indicated in first stage SCI, is allowed to be different in initial transmission and retransmission(s), then R is the reference coding rate, $Q_m$ is the reference modulation order, and v is the reference layer number (pre)configured per resource pool.

In some embodiments, if the scheduled MCS and PSSCH layer number, as indicated in first stage SCI, is not allowed to be different in initial transmission and retransmission(s) R and $Q_m$ are from the scheduled MCS, and v is from the scheduled DMRS port number, as indicated in first stage SCI.

The intermediate number of information bits is equal to the multiplication of code rate, modulation order, number of layers and the total number of resource elements for data transmission. Under the assumption that the number of REs for data transmission in each allocated data channel resource blocks is identical, the total number of REs for data transmission may be based on the calculation of the number of resource elements for data transmission per resource block.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 7:
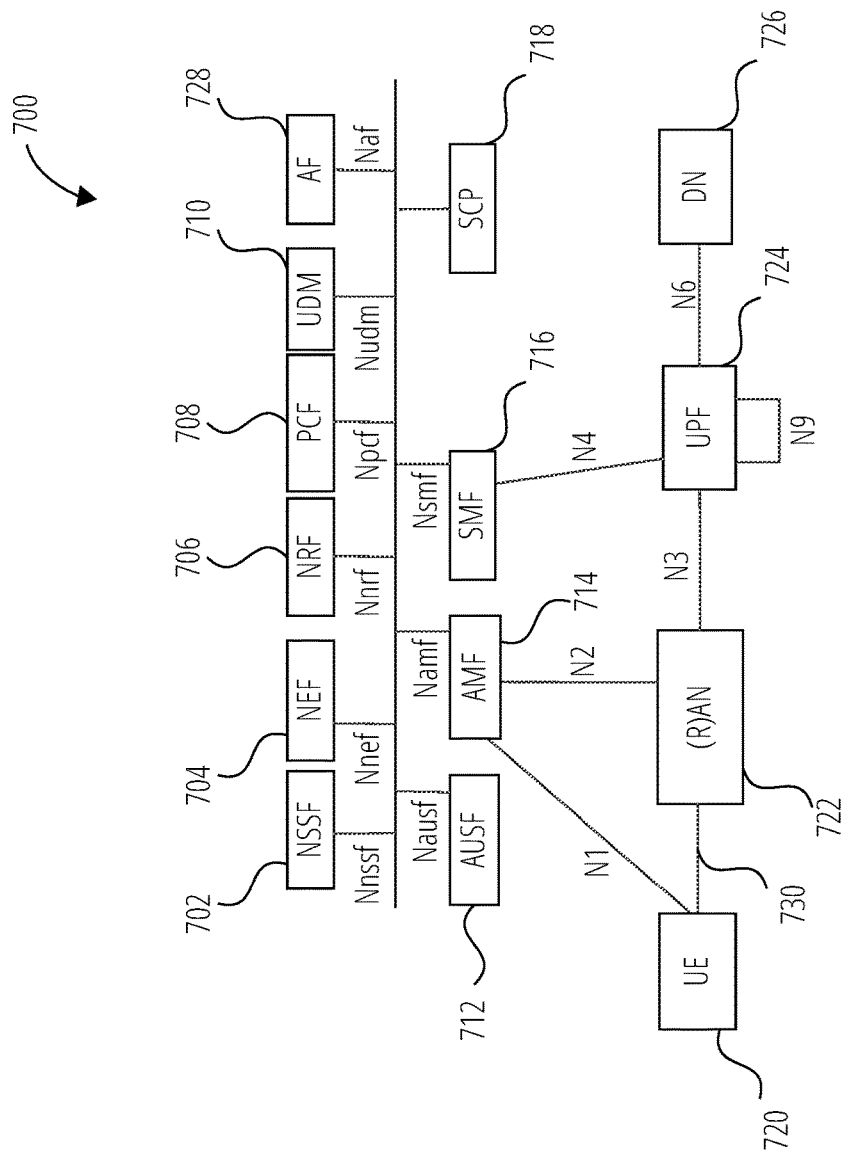
FIG. 7 illustrates an example service based architecture in accordance with certain embodiments.

FIG. 7 illustrates a service based architecture 700 in 5GS according to one embodiment. As described in 3GPP TS 23.501, the service based architecture 700 comprises NFs such as an NSSF 702, a NEF 704, an NRF 706, a PCF 708, a UDM 710, an AUSF 712, an AMF 714, an SMF 716, for communication with a UE 720, a (R)AN 722, a UPF 724, and a DN 726. The NFs and NF services can communicate directly, referred to as Direct Communication, or indirectly via a SCP 718, referred to as Indirect Communication. FIG. 7 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 7 are described below.

The NSSF 702 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 704 supports exposure of capabilities and events. NF capabilities and events may be securely exposed by the NEF 704 (e.g., for 3rd party, Application Functions, and/or Edge Computing). The NEF 704 may store/retrieve information as structured data using a standardized interface (Nudr) to a UDR. The NEF 704 may also secure provision of information from an external application to 3GPP network and may provide for the Application Functions to securely provide information to the 3GPP network (e.g., expected UE behavior, 5GLAN group information, and service specific information), wherein the NEF 704 may authenticate and authorize and assist in throttling the Application Functions. The NEF 704 may provide translation of internal-external information by translating between information exchanged with the AF and information exchanged with the internal network function. For example, the NEF 704 translates between an AF-Service-Identifier and internal 5G Core information such as DNN and S-NSSAI. The NEF 704 may handle masking of network and user sensitive information to external AF's according to the network policy. The NEF 704 may receive information from other network functions (based on exposed capabilities of other network functions), and stores the received information as structured data using a standardized interface to a UDR. The stored information can be accessed and re-exposed by the NEF 704 to other network functions and Application Functions, and used for other purposes such as analytics. For external exposure of services related to specific UE(s), the NEF 704 may reside in the HPLMN. Depending on operator agreements, the NEF 704 in the HPLMN may have interface(s) with NF(s) in the VPLMN. When a UE is capable of switching between EPC and 5GC, an SCEF+NEF may be used for service exposure.

The NRF 706 supports service discovery function by receiving an NF Discovery Request from an NF instance or SCP and providing the information of the discovered NF instances to the NF instance or SCP. The NRF 706 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 708 supports a unified policy framework to govern network behavior. The PCF 708 provides policy rules to Control Plane function(s) to enforce them. The PCF 708 accesses subscription information relevant for policy decisions in a Unified Data Repository (UDR). The PCF 708 may access the UDR located in the same PLMN as the PCF.

The UDM 710 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 710 uses subscription data (including authentication data) that may be stored in a UDR, in which case a UDM implements the application logic and may not require an internal user data storage and several different UDMs may serve the same user in different transactions. The UDM 710 may be located in the HPLMN of the subscribers it serves, and may access the information of the UDR located in the same PLMN.

The AF 728 interacts with the Core Network to provide services that, for example, support the following: application influence on traffic routing; accessing the NEF 704; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to directly access the Network Functions may use the external exposure framework via the NEF 704 to interact with relevant Network Functions.

The AUSF 712 supports authentication for 3GPP access and untrusted non-3GPP access. The AUSF 712 may also provide support for Network Slice-Specific Authentication and Authorization.

The AMF 714 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 714. Regardless of the number of Network functions, in certain embodiments there is only one NAS interface instance per access network between the UE and the CN, terminated at one of the Network functions that implements at least NAS security and Mobility Management. The AMF 714 may also include policy related functionalities.

In addition to the functionalities described above, the AMF 714 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 716 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 716 may include policy related functionalities.

The SCP 718 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 718 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 720 may include a device with radio communication capabilities. For example, the UE 720 may comprise a smartphone (e.g., handheld touchscreen mobile computing devices connectable to one or more cellular networks). The UE 720 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 720 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 720 may be configured to connect or communicatively couple with the (R)AN 722 through a radio interface 730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 720 and the (R)AN 722 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 722 to the UE 720 and a UL transmission may be from the UE 720 to the (R)AN 722. The UE 720 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 722 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 722 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 722) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 720 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 724 may act as an anchor point for intra-RAT and inter-RAT mobility, an external PDU session point of interconnect to the DN 726, and a branching point to support multi-homed PDU session. The UPF 724 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 724 may include an uplink classifier to support routing traffic flows to a data network. The DN 726 may represent various network operator services, Internet access, or third party services. The DN 726 may include, for example, an application server.

Figure 8:
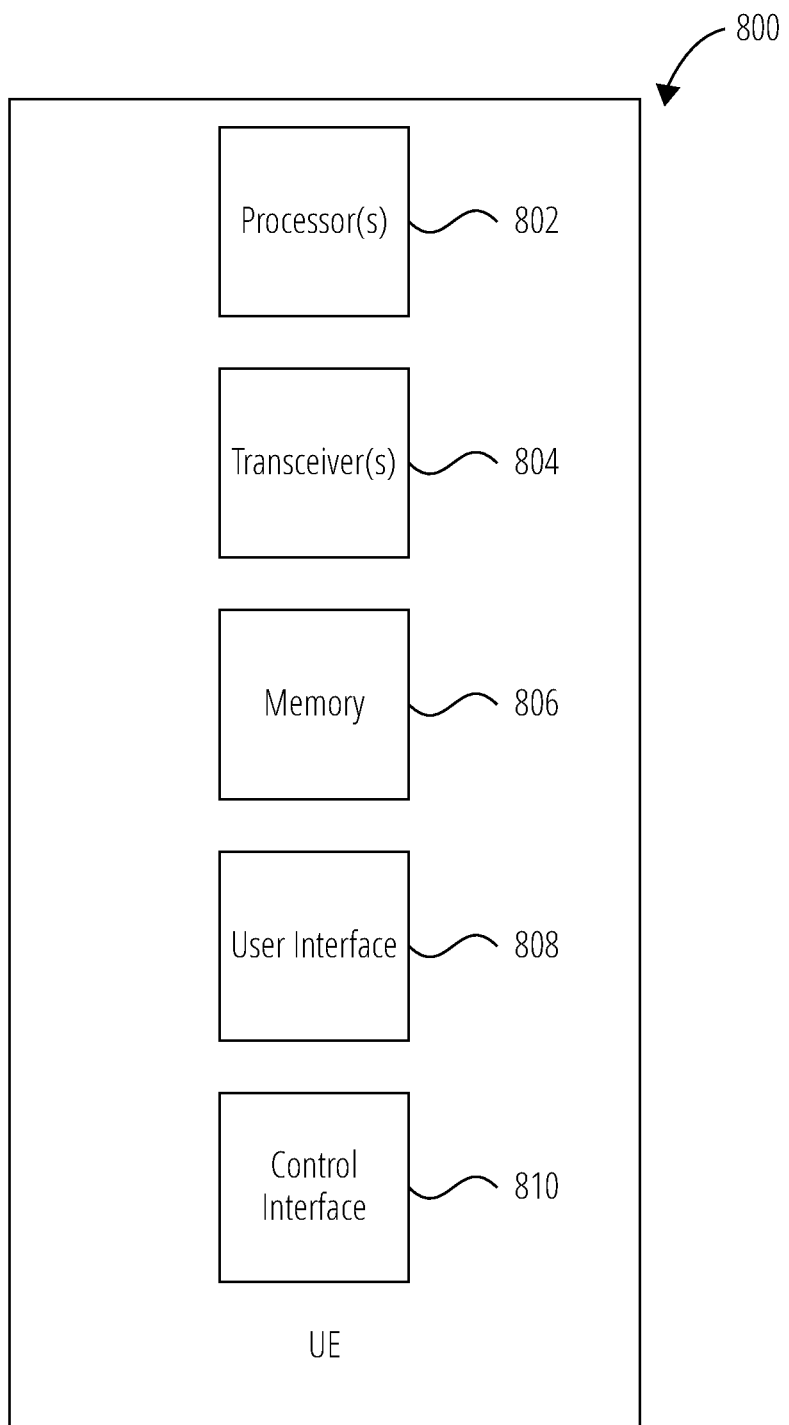
FIG. 8 illustrates a user equipment (UE) in accordance with one embodiment.

FIG. 8 is a block diagram of an example UE 800 configurable according to various embodiments of the present disclosure, including by execution of instructions on a computer-readable medium that correspond to any of the example methods and/or procedures described herein. The UE 800 comprises one or more processor 802, transceiver 804, memory 806, user interface 808, and control interface 810.

The one or more processor 802 may include, for example, an application processor, an audio digital signal processor, a central processing unit, and/or one or more baseband processors. Each of the one or more processor 802 may include internal memory and/or may include interface(s) to communication with external memory (including the memory 806). The internal or external memory can store software code, programs, and/or instructions for execution by the one or more processor 802 to configure and/or facilitate the UE 800 to perform various operations, including operations described herein. For example, execution of the instructions can configure the UE 800 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 804, user interface 808, and/or control interface 810. As another example, the one or more processor 802 may execute program code stored in the memory 806 or other memory that corresponds to MAC, RLC, PDCP, and RRC layer protocols standardized by 3GPP (e.g., for NR and/or LTE). As a further example, the processor 802 may execute program code stored in the memory 806 or other memory that, together with the one or more transceiver 804, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 806 may comprise memory area for the one or more processor 802 to store variables used in protocols, configuration, control, and other functions of the UE 800, including operations corresponding to, or comprising, any of the example methods and/or procedures described herein. Moreover, the memory 806 may comprise non-volatile memory (e.g., flash memory), volatile memory (e.g., static or dynamic RAM), or a combination thereof. Furthermore, the memory 806 may interface with a memory slot by which removable memory cards in one or more formats (e.g., SD Card, Memory Stick, Compact Flash, etc.) can be inserted and removed.

The one or more transceiver 804 may include radio-frequency transmitter and/or receiver circuitry that facilitates the UE 800 to communicate with other equipment supporting like wireless communication standards and/or protocols. For example, the one or more transceiver 804 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 802. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals, and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 804 includes a transmitter and a receiver that enable device 1200 to communicate with various 5G/NR networks according to various protocols and/or methods proposed for standardization by 3GPP and/or other standards bodies. For example, such functionality can operate cooperatively with the one or more processor 802 to implement a PHY layer based on OFDM, OFDMA, and/or SC-FDMA technologies, such as described herein with respect to other figures.

The user interface 808 may take various forms depending on particular embodiments, or can be absent from the UE 800. In some embodiments, the user interface 808 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 800 may comprise a tablet computing device including a larger touchscreen display. In such embodiments, one or more of the mechanical features of the user interface 808 may be replaced by comparable or functionally equivalent virtual user interface features (e.g., virtual keypad, virtual buttons, etc.) implemented using the touchscreen display, as familiar to persons of ordinary skill in the art. In other embodiments, the UE 800 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 800 having a touch screen display are capable of receiving user inputs, such as inputs related to exemplary methods and/or procedures described herein or otherwise known to persons of ordinary skill in the art.

In some exemplary embodiments of the present disclosure, the UE 800 may include an orientation sensor, which can be used in various ways by features and functions of the UE 800. For example, the UE 800 can use outputs of the orientation sensor to determine when a user has changed the physical orientation of the UE 800's touch screen display. An indication signal from the orientation sensor can be available to any application program executing on the UE 800, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 810 may take various forms depending on particular embodiments. For example, the control interface 810 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 810 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 800 may include more functionality than is shown in FIG. 8 including, for example, a video and/or still-image camera, microphone, media player and/or recorder, etc. Moreover, the one or more transceiver 804 may include circuitry for communication using additional radio-frequency communication standards including Bluetooth, GPS, and/or others. Moreover, the one or more processor 802 may execute software code stored in the memory 806 to control such additional functionality. For example, directional velocity and/or position estimates output from a GPS receiver can be available to any application program executing on the UE 800, including various exemplary methods and/or computer-readable media according to various exemplary embodiments of the present disclosure.

Figure 9:
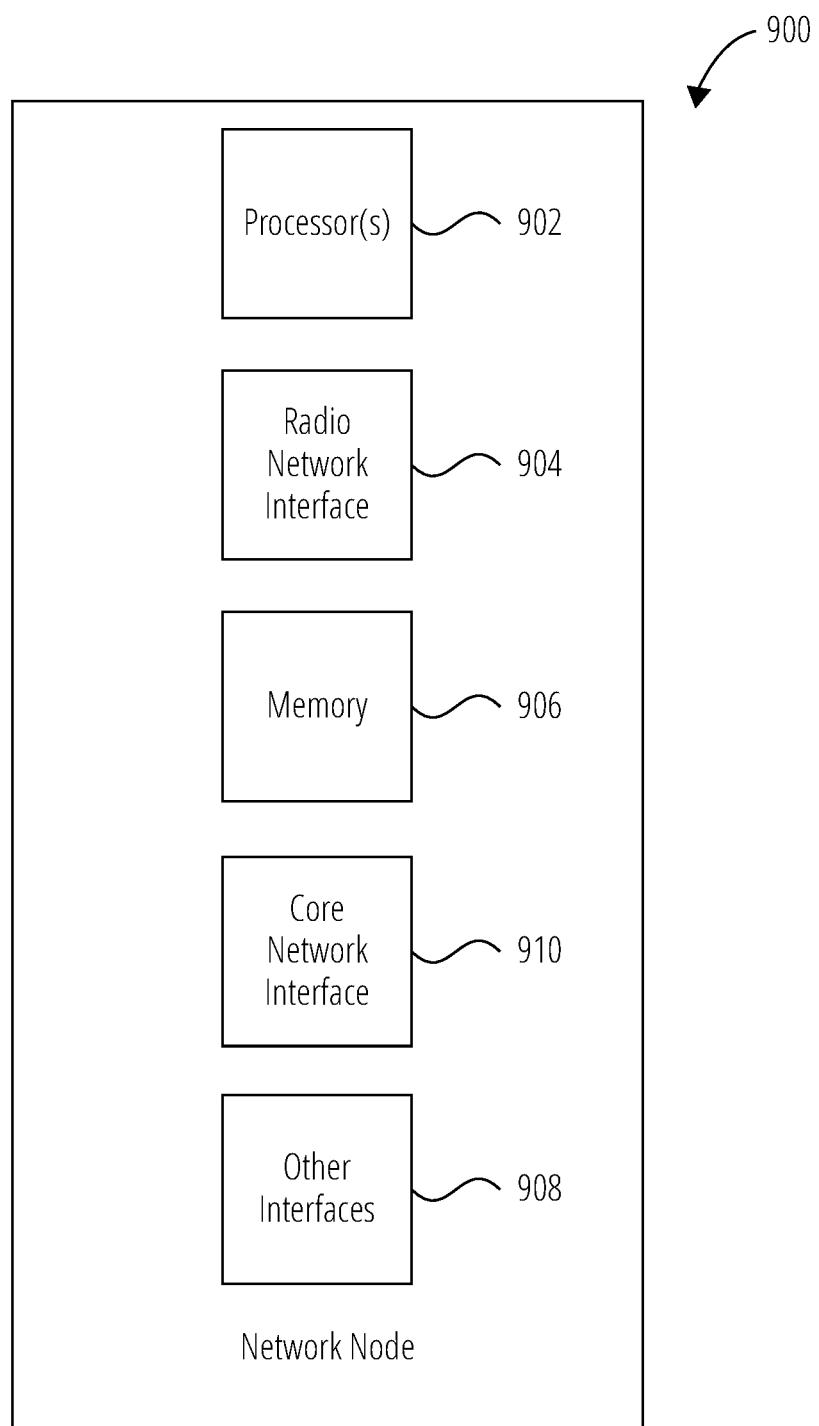
FIG. 9 illustrates a network node in accordance with one embodiment.

FIG. 9 is a block diagram of an example network node 900 configurable according to various embodiments of the present disclosure, including by execution of instructions on a computer-readable medium that correspond to any of the example methods and/or procedures described herein.

The network node 900 includes a one or more processor 902, a radio network interface 904, a memory 906, a core network interface 910, and other interfaces 908. The network node 900 may comprise, for example, a base station, eNB, gNB, access node, or component thereof.

The one or more processor 902 may include any type of processor or processing circuitry and may be configured to perform one of the methods or procedures disclosed herein. The memory 906 may store software code, programs, and/or instructions executed by the one or more processor 902 to configure the network node 900 to perform various operations, including operations described herein. For example, execution of such stored instructions can configure the network node 900 to communicate with one or more other devices using protocols according to various embodiments of the present disclosure, including one or more methods and/or procedures discussed above. Furthermore, execution of such stored instructions can also configure and/or facilitate the network node 900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 904 and the core network interface 910. By way of example and without limitation, the core network interface 910 comprise an S1 interface and the radio network interface 904 may comprise a Uu interface, as standardized by 3GPP. The memory 906 may also store variables used in protocols, configuration, control, and other functions of the network node 900. As such, the memory 906 may comprise non-volatile memory (e.g., flash memory, hard disk, etc.), volatile memory (e.g., static or dynamic RAM), network-based (e.g., "cloud") storage, or a combination thereof.

The radio network interface 904 may include transmitters, receivers, signal processors, ASICs, antennas, beamforming units, and other circuitry that enables network node 900 to communicate with other equipment such as, in some embodiments, a plurality of compatible user equipment (UE). In some embodiments, the network node 900 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 904 may include a PHY layer based on OFDM, OFDMA, and/or SC-FDMA technologies. In some embodiments, the functionality of such a PHY layer can be provided cooperatively by the radio network interface 904 and the one or more processor 902.

The core network interface 910 may include transmitters, receivers, and other circuitry that enables the network node 900 to communicate with other equipment in a core network such as, in some embodiments, circuit-switched (CS) and/or packet-switched Core (PS) networks. In some embodiments, the core network interface 910 may include the S1 interface standardized by 3GPP. In some embodiments, the core network interface 910 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 910 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 908 may include transmitters, receivers, and other circuitry that enables the network node 900 to communicate with external networks, computers, databases, and the like for purposes of operations, administration, and maintenance of the network node 900 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

The following provides details and examples for some embodiments herein.

The Release-16 NR V2X specifications were approved in December 2019 (Chairman's Notes, 3GPP TSG RAN #86 Meeting, Sitges, ES, December 2019). The remaining tasks for NR V2X were identified in RP-193198, Task list for 5G V2X in RAN1 #100, Sitges, ES, December 2019, where some of these tasks were discussed in RAN1 meeting #100-e (Chairman's Notes, 3GPP TSG RAN1 WG1 #100-e Meeting, February 2020).

Embodiments herein discuss the details on some of the identified remaining tasks, including sidelink TBS determination, resource pool configuration, initialization of the scrambling sequence generators for first stage SCI, second stage SCI and data transmitted on PSSCH, second stage SCI formats, as well as MCS table for sidelink data transmissions.

In NR Uu link, the transport block size (TBS) is determined by a formula or a look-up table. The selection from formula or look-up table is based on intermediate number of information bits. Specifically, if the intermediate number is larger than 3824, then TBS is calculated by formula, otherwise, TBS is obtained from look-up table.

The intermediate number of information bits is equal to the multiplication of code rate, modulation order, number of layers and the total number of resource elements (RE) for data transmission. Under the assumption that the number of REs for data transmission in each allocated data channel resource blocks (RB) is identical, the total number of REs for data transmission is based on the calculation of the number of REs for data transmission per RB. Here, the overheads from DMRS, CSI-RS and CORESET are reduced in the calculation.

In certain implementations for sidelink TBS determination, the procedure steps 2), 3) and 4) in Section 5.1.3.2 of TS38.214 are reused. A remaining issue is how to calculate the number of resource elements $N_{RE}$ for sidelink data. Further, in certain implementations for sidelink TBS determination, N_RE' and/or N_RE are calculated based on the procedure step 1) in 5.1.3.2 Transport block size determination of TS38.214 with the following considerations. For the number of PSSCH symbols, AGC symbol and GP symbol in the end of slot are excluded. For PSCCH overhead the exact number of REs for PSCCH (including PSCCH DMRS) is considered. For 2nd SCI overhead, it is to be determined how to consider the 2nd SCI and how to handle the relationship between PSSCH TBS determination and 2nd stage SCI modulated symbols determination. It may also be useful to determine how to consider PSFCH, PSSCH DMRS, GP symbols before PSFCH, SL PT-RS, SL CSI-RS. N_oh^PRB may be introduced or not (pre-)configured per resource pool. In certain implementations a UE is not expected to receive a retransmission with a TB size that is different from the last valid TB size signaled for this TB. The design may be such that the TBS is the same between a transmission and its re-transmission(s).

Embodiments herein discuss the overhead calculation of PSFCH, GP symbol before PSFCH, second stage SCI, PSSCH DMRS, sidelink PT-RS and sidelink CSI-RS, respectively.

In some embodiments PSFCH and GP symbol before PSFCH is as follows. The GP symbol before PSFCH is always associated with PSFCH. Hence, it is rational to combine the overhead of GP symbols before PSFCH with the overhead of PSFCH.

In a resource pool (pre)configuration, the PSFCH periodicity is either of 0, 1, 2 and 4 slots. For the case of PSFCH periodicity being 0 slot, there is no PSFCH resource configured and hence no PSFCH overhead should be counted in the sidelink TBS calculation. For the case of PSFCH periodicity being 1 slot, PSFCH resources exist in every sidelink slot. Here, the number of PSFCH symbols is counted as 3 in the overhead calculation, including a GP symbol before PSFCH and 2 PSFCH symbols.

For the case of PSFCH periodicity being 2 or 4 slots, PSFCH resources may or may not exist in a sidelink slot. It is possible that an initial transmission occurs in a slot with PSFCH resources while retransmission(s) occur in a slot without PSFCH resources, or vice versa. To align the TBS calculation between initial transmission and retransmission(s), a (pre)configured reference PSFCH symbol number should be used for the PSFCH overhead calculation. The (pre)configured reference PSFCH symbol number should be between 0 and 3, and (pre)configuration is per PSFCH periodicity (i.e., 2 or 4 slots) per resource pool.

Overall, the number of REs for PSFCH and GP symbols before PSFCH is $$N_{RE}^{PSFCH} = N_{SC}^{RB} \cdot N_{RB}^{subchannel} \cdot N_{subchannel}^{PSSCH} \cdot N_{symbol}^{PSFCH},$$

where $N_{SC}^{RB}=12$, $N_{RB}^{subchannel}$ is the sub-channel size (pre)configured per resource pool, $N_{subchannel}^{PSSCH}$ is the number of scheduled sub-channels of the PSSCH, and $N_{symbol}^{PSFCH}$ is the (pre)configured reference number of PSFCH symbols.

The formula to calculate the number of coded modulation symbols per layer for second stage SCI is discussed herein. Like in NR UCI transmissions on PUSCH, this formula depends on sidelink TBS. If the same formula is used to calculate the second stage SCI overhead for sidelink TBS, then there is a cyclic dependency between TBS calculation and the calculation of number of REs for second stage SCI.

Certain embodiments use a new formula to calculate second stage SCI overhead just for sidelink TBS calculation, where the formula does not rely on sidelink TBS. The formula is based on reference parameters which are (pre) configured per resource pool, so that the same reference parameters are used for both initial transmission and retransmission(s). The new formula comprises $$N_{RE}^{SCI2} = \min\left\{\left\lceil \frac{(O_{SCI2}+L_{SCI2})\beta_{offset}^{SCI2}}{2 \cdot R} \right\rceil, \left\lceil \alpha \cdot \sum_{l=0}^{N_{symbol}^{SCI2}-1} M_{SC}^{SCI2}(l) \right\rceil\right\},$$

where $O_{SCI2}$ is the payload size of a second stage SCI format, which is indicated by the first stage SCI, $L_{SCI2}$ is the CRC length of second stage SCI, R is the target coding rate indicated by the first stage SCI, $M_{SC}^{SCI2}(l)$ is the number of REs that can be used for transmission of the second stage SCI on the l-th symbol, and a is the scaling factor (pre) configured per resource pool. Note that it is expected the second stage SCI format (and hence, second stage SCI payload size) does not change between initial transmission and retransmission(s). Hence, $O_{SCI2}$ indicated in initial transmission is always equal to that indicated in retransmission(s).

Here, the number of allowed symbols for second stage SCI $N_{symbol}^{SCI2}$ is equal to the (pre)configured number of symbols for sidelink in a slot minus AGC symbol, GP symbol in the end of slot, and the (pre)configured reference number of PSFCH symbols $N_{symbol}^{PSFCH}$ as discussed above. The $\beta_{offset}^{SCI2}$ is a reference beta offset (pre)configured per resource pool. The use of reference beta offset in second stage SCI overhead calculation allows the dynamic beta offset indicated in first stage SCI to be different in initial transmission and retransmission(s).

Since, in some embodiments, only DMRS configuration type 1 is used for frequency domain PSSCH DMRS, the number of REs for PSSCH DMRS only depends on the PSSCH DMRS time domain pattern. The PSSCH DMRS time domain pattern is dynamically adjusted and signaled in the first stage SCI, hence the actual number of PSSCH DMRS REs can change between initial transmission and retransmission(s). Overall, the number of REs for PSSCH DMRS is calculated by $$N_{RE}^{PSSCH-DMRS}=\sum_{i=0}^{N_{symbol}^{PSSCH-DMRS}} N_{RE}^{PSSCH-DMRS}(i),$$

where $N_{symbol}^{PSSCH-DMRS}$ is the number of PSSCH DMRS symbols and $N_{RE}^{PSSCH-DMRS}(i)$ is the number of REs that can be used for PSSCH DMRS on the i-th symbol. To align the TBS calculation from initial transmission and retransmission(s), the value $N_{symbol}^{PSSCH-DMRS}$ needs to be (pre) configured per resource pool. $N_{symbol}^{PSSCH-DMRS}$ may be selected from the (pre)configured set of PSSCH DMRS time domain patterns, where the selection depends on $N_{symbol}^{PSFCH}$. Specifically, if $N_{symbol}^{PSFCH}=0$, then $N_{symbol}^{PSSCH-DMRS}$ is the largest in the (pre)configured set of PSSCH DMRS time domain patterns; if $N_{symbol}^{PSFCH}=3$, then $N_{symbol}^{PSSCH-DMRS}$ is the smallest in the (pre)configured set of PSSCH DMRS time domain patterns.

The time density of sidelink PTRS depends on the MCS indicated in the first stage SCI and the frequency density of sidelink PTRS depends on scheduled bandwidth of PSSCH.

In some embodiments, the Sidelink CSI-RS may be as follows. The sidelink CSI-RS only exists for sidelink unicast. Hence, the sidelink CSI-RS overhead should only be counted for sidelink unicast. Also, the number of (pre) configured CSI-RS port(s) should be used in the calculation of sidelink CSI-RS overhead $N_{RE}^{CSI-RS}$.

Finally, the number of REs allocated for sidelink data is given by $$N_{RE}=N_{RE}^{PSCCH/PSSCH}-N_{RE}^{PSCCH}-N_{RE}^{SCI2}-N_{RE}^{PSFCH}-N_{RE}^{PSCCH-DMRS}-N_{RE}^{PTRS}-N_{RE}^{CSI-RS},$$

where $N_{RE}^{PSCCH/PSSCH}=N_{SC}^{RB} \cdot N_{RB}^{subchannel} \cdot N_{subchannel}^{PSSCH} \cdot N_{symbol}^{PSSCH}$ is the total number of REs allocated for sidelink transmissions, with $N_{symbol}^{PSSCH}$ not including AGC symbol and GP symbol in the end of slot, and $N_{RE}^{PSCCH}$ is the number of PSCCH overhead with exact number calculated based on resource pool (pre)configuration.

In some embodiments: In sidelink TBS determination, the number of sidelink data REs is calculated by deducting overheads from the total number of REs used for sidelink transmission in a slot excluding AGC symbol and GP symbol in the end of slot. Specifically, $$N_{RE}=N_{RE}^{PSCCH/PSSCH}-N_{RE}^{PSCCH}-N_{RE}^{SCI2}-N_{RE}^{PSFCH}-N_{RE}^{PSCCH-DMRS}-N_{RE}^{PTRS}-N_{RE}^{CSI-RS}.$$

In some embodiments: In sidelink TBS determination, the PSFCH overhead $N_{RE}^{PSFCH}$ is calculated by setting the reference number of PSFCH symbols (including GP symbol before PSFCH) $N_{symbol}^{PSFCH}$ as 3 if PSFCH periodicity is 1 slot; 0 if PSFCH periodicity is 0 slot; a (pre)configured value of resource pool if PSFCH periodicity is 2 or 4 slots.

In some embodiments: In sidelink TBS determination, the second stage SCI overhead $N_{RE}^{SCI2}$ is calculated by $$N_{RE}^{SCI2} = \min\left\{\left\lceil \frac{(O_{SCI2}+L_{SCI2})\beta_{offset}^{SCI2}}{2 \cdot R} \right\rceil, \left\lceil \alpha \cdot \sum_{l=0}^{N_{symbol}^{SCI2}-1} M_{SC}^{SCI2}(l) \right\rceil\right\},$$

where the second stage SCI payload size $O_{SCI2}$ is indicated by the first stage SCI, the number of allowed second stage SCI symbols $N_{symbol}^{SCI2}$ is equal to the (pre)configured number of symbols used for sidelink in a slot minus AGC symbol, GP symbol in the end of slot, and the reference number of PSFCH symbols $N_{symbol}^{PSFCH}$, and the reference beta offset $\beta_{offset}^{SCI2}$ is (pre)configured by resource pool.

In some embodiments: In sidelink TBS determination, the PSSCH DMRS overhead $N_{RE}^{PSSCH-DMRS}$ is calculated by $\sum_{i=0}^{N_{symbol}^{PSSCH-DMRS}} N_{RE}^{PSSCH-DMRS}(i)$, where $N_{symbol}^{PSSCH-DMRS}$ is selected from (pre)configured DMRS time patterns based on $N_{symbol}^{PSFCH}$.

In some embodiments: In sidelink TBS determination, the sidelink PTRS overhead $N_{RE}^{PTRS}$ is based on the scheduled MCS and scheduled PSSCH bandwidth.

In some embodiments: In sidelink TBS determination, the sidelink CSI-RS overhead $N_{RE}^{CSI-RS}$ is only counted for sidelink unicast.

In some embodiments Resource Pool Configuration may be as follows. Slots for a resource pool may be (pre) configured with bitmap, which is applied with periodicity. The bitmap length and the periodicity have not been determined. In certain embodiments, the periodicity can be set as 10240 ms, as in LTE V2X. This is aligned with SFN cycle.

In LTE V2X, the bitmap length depends on 3-bit TDD configuration indication in either PSBCH or in SIB1. More flexible TDD configuration is supported in NR Uu, with configurations in "TDD-UL-DL-ConfigCommon" IE. However, due to the payload size limitation, the PSBCH only supports 12-bit TDD configuration indication. Hence, the TDD configuration indication in PSBCH may be misaligned with the TDD configuration in NR Uu. In certain embodiments, from the common multiple of all possible combination of periodicity, $L_{bitmap}=20 \cdot 2^\mu$, where $\mu$ is the sidelink SCS.

In some embodiments: For time domain resources of a resource pool, the periodicity is 10240 ms and $L_{bitmap}$ is $20 \cdot 2^\mu$.

It may be assumed, in certain embodiments, that a resource pool is allowed to be configured with all PRBs in a sidelink BWP. This leads to the possibility of the number of PRBs of a resource pool not being a multiple of sub-channel size. Certain systems are unclear on how to deal with the remaining PRBs under this condition. In certain embodiments, all the sub-channels of a resource pool should have the same size. This does not impact the existing RRC parameters and existing system designs. If some sub-channels have a larger number of PRBs, then the sidelink measurement (e.g., sidelink RSRP and sidelink RSSI) needs to be adjusted accordingly, which complicates UE implementation.

In some embodiments: If the configured PRBs for resource pool is not a multiple of sub-channel size, then the remainder PRBs with the highest indices are not used.

Embodiments may approach Initialization of Scrambling Sequences as follows. In LTE V2X, the scrambling sequence for PSCCH is a gold sequence with initialization value being a constant 510. This constant value ensures every receiver UE could decode PSCCH. This is because LTE V2X supports sidelink broadcast and the resource reservation information in PSCCH needs to be decoded by all Mode 4 UEs for their resource allocation operations.

In NR V2X, the resource reservation information is contained in first stage SCI, which is carried on PSCCH. Since this information is needed for all Mode 2 UEs' resource allocation operations, PSCCH needs to be decodable by all UEs. Hence, like in LTE V2X, a constant initialization value should be used for the PSCCH scrambling sequence generator.

In some embodiments: The scrambling sequence for first stage SCI is a gold sequence with a constant initialization value.

In certain embodiments, separate scrambling is applied on second stage SCI and PSSCH. Similar to the scrambling sequence of PSCCH, the scrambling sequence of second stage SCI is a gold sequence. The initialization value of the gold sequence is based on PSCCH CRC. This design facilitates early termination of second stage SCI polar decoding in case of miss detection of PSCCH. Specifically, the initialization value is set as $c_{init}=n_{RNTI}2^{15}+n_{const}$, where $n_{const}$ is a constant with value equal to PSCCH scrambling sequence initialization value, and $n_{RNTI}$ is the 16 LSB of PSCCH CRC.

In some embodiments: The scrambling sequence for second stage SCI is a gold sequence with initialization value depending on PSCCH CRC. Specifically, $c_{init}=n_{RNTI}2^{15}+n_{const}$, where $n_{const}$ is a constant with value equal to PSCCH scrambling sequence initialization value, and $n_{RNTI}$ is the 16 LSB of PSCCH CRC.

Furthermore, the scrambling sequence of PSSCH data is also a gold sequence with initialization value depending on both first stage SCI CRC and second stage SCI CRC. Note that part of PSSCH data decoding information is contained in second stage SCI (e.g., source ID, destination ID, HARQ process number, etc). The miss detection of second stage SCI may lead to unsuccessful decoding of PSSCH data. Furthermore, due to the limited randomness contained in second stage SCI (and hence, its CRC), part of first stage SCI CRC can also be used in the initialization value for PSSCH data scrambling sequence. Specifically, the initialization value is set as $c_{init}=n_{RNTI}2^{15}+n_{const}$, where $n_{const}$ is a constant with value equal to PSCCH scrambling sequence initialization value, $n_{RNTI}$ is the XOR of the 16 MSB of first stage SCI CRC and 16 LSB of second stage SCI CRC.

In some embodiments: The scrambling sequence for data on PSSCH is a gold sequence with initialization value depending on both first stage SCI CRC and second stage SCI CRC. Specifically, $c_{init}=n_{RNTI}2^{15}+n_{const}$, where $n_{const}$ is a constant with value equal to PSCCH scrambling sequence initialization value, $n_{RNTI}$ is the XOR of 16 MSB of first stage SCI CRC and 16 LSB of second stage SCI CRC.

In some embodiments, Second Stage SCI Formats may be as follows. Two-stage SCI design was adopted in NR V2X, where the first stage SCI (or, SCI format 0_1) contains time and frequency resource assignment, priority, DMRS pattern, second stage SCI format, beta-offset indicator, number of DMRS port, MCS and reserved bits. The second stage SCI (or, SCI format 0_2) contains HARQ process ID, NDI, RV, source ID, destination ID, CSI request, zone ID and communication range requirement.

In certain embodiments, not all the fields in second stage SCI is used in every cast-type and two options of groupcast. For example, the zone ID and communication range requirements are only used for groupcast HARQ option 1. The estimated field size and applicability in Table 1.

TABLE 1

| | Estimated second stage SCI payload size for cast-types | | | | |
|---|---|---|---|---|---|
| Payload field | Payload size (bits) | Broadcast | Unicast (w. or w/o feedback) | Groupcast without feedback | Groupcast HARQ option 1 | Groupcast HARQ option 2 |
| Source ID | 8 | Yes | Yes | Yes | Yes | Yes |
| Destination ID | 16 | Yes | Yes | Yes | Yes | Yes |
| HARQ process ID, NDI, RV | ~7 | Yes | Yes | Yes | Yes | Yes |
| CSI request | 1 | No | Yes | No | No | No |
| Zone ID and communication range requirement | 16 | No | No | No | Yes | No |
| Total approximate payload size without CRC (bits) | ~48 | 31 | 32 | 31 | 47 | 31 |

As shown in Table 1, second stage SCI payload size for groupcast HARQ option 1 is larger than that for other cast-types. Based on this observation, certain embodiments use two second stage SCI formats: one for broadcast, unicast and groupcast without feedback, groupcast HARQ option 2 and unicast with feedback; the other one for groupcast HARQ option 1.

In some embodiments: Two second stage SCI formats are defined. The first format is used for broadcast, unicast and groupcast without feedback, groupcast HARQ option 2 and unicast with feedback. The second format is used for groupcast HARQ option 1.

The field of "second stage SCI format" in first stage SCI should be 2 bits, to indicate one of two second stage SCI formats. The last two code points of this field are reserved for future use.

In some embodiments: The size of the "second stage SCI format" field in first stage SCI is 2 bits.

It is may be assumed, in certain embodiments, that for groupcast and unicast when PSFCH resource is (pre-)configured in the resource pool, SCI explicitly indicates whether HARQ feedback is used or not for the corresponding PSSCH transmission. The dynamic disabling of HARQ feedback can be achieved by adding a single bit in the first format of second stage SCI.

In some embodiments: For the first format of second stage SCI, an additional bit is included in second stage SCI to indicate whether HARQ feedback is disabled.

The first format of second stage SCI is used for groupcast option 2 and unicast with feedback. The PSFCH resource determination schemes are different for these two cast types. The PSFCH resource for unicast is determined only by layer 1 source ID, while the PSFCH resource for groupcast option 2 is determined by both layer 1 source ID and group member ID. Hence, it is necessary to indicate the PSFCH resource determination scheme if HARQ feedback is enabled.

In some embodiments: For the first format of second stage SCI, an additional bit is included in second stage SCI to indicate PSFCH resource determination scheme.

Polar coding used for PDCCH may be applied to the second stage SCI. The CRC length of second stage SCI is undetermined in certain systems. In certain embodiments, the CRC length of second stage SCI may be 24 bits, same as CRC length of PDCCH. The 24-bit CRC polynomial is designed to support the early termination functionality of polar decoding, which is important for UEs with limited processing capability and power. In sidelink, the same polar decoding early termination should be applied at receiver UE to save processing time and power.

Certain systems use a shorter CRC length for second stage SCI to reduce overhead. However, the payload size of second stage SCI is more than 30 bits based on Table 1, which is similar to fallback DCI payload size. Since a fallback DCI uses 24-bit CRC, the same CRC length may be applicable to second stage SCI.

In some embodiments: CRC length of second stage SCI is 24 bits.

Certain embodiments support all three MCS tables for Rel-15 NR Uu CP-OFDM for NR V2X sidelink. The support of the low-spectral efficiency 64QAM MCS table in sidelink is an optional UE feature, as in the Uu link. The support of 256QAM from the transmitter perspective is based on UE capability. The support of 256QAM from the receiver perspective may be, for example, mandatory or based on UE capability.

In Rel-15 NR Uu link, the support of 256QAM is mandatory for PDSCH in FR1 but is optional for PDSCH in FR2. Since the support of 256QAM is optional for PUSCH, the support of 256QAM from both transmitter perspective and receiver perspective is optional in FR2 based on UE capability. In certain embodiments, this UE capability is extended to NR V2X sidelink, i.e., the support of 256QAM in FR2 is optional based on UE capability.

Since NR V2X sidelink targets a common design for FR1 and FR2, 256QAM may be supported from the receiver perspective in both FR1 and FR2 based on UE capability.

In some embodiments: Support of 256QAM by a UE from the receiver perspective is based on UE capability.

The 256QAM MCS table is targeted for high throughput use cases in good channel conditions. In sidelink broadcast and groupcast, it is not guaranteed that the channels from transmitter UE to each receiver UE are in good condition simultaneously. Hence, the usage scenario of 256QAM MCS table is limited.

On the other hand, a motivation of using the low-spectral efficiency 64QAM MCS table is to achieve ultra-reliable transmissions in one-shot. This is useful for URLLC use cases. For ultra-reliable transmissions, the low-spectral efficiency 64QAM MCS table is used accompanied with the low-spectral efficiency 64QAM CQI table for a target BLER of $1\cdot10^{-5}$. In NR V2X sidelink, CQI report is only supported for sidelink unicast. This implies the usage of the low-spectral efficiency 64QAM MCS table is limited to sidelink unicast.

Furthermore, the support of 256QAM may depend on UE capability. The exchange of UE capability may be impossible for sidelink broadcast and many sidelink groupcast cases. Hence, it may be inefficient to support 256QAM MCS table and low-spectral efficiency MCS table for sidelink broadcast and groupcast.

It may be observed that the benefit of using 256QAM MCS table and low-spectral efficiency 64QAM MCS table is unclear in sidelink broadcast and groupcast.

Since a resource pool is designed to support sidelink unicast, groupcast and broadcast. The only MCS table applicable to all cast-types is the legacy 64QAM MCS table. Hence, the 64QAM MCS table may be set as the default MCS table for NR V2X sidelink. The usage of 256QAM MCS table and low-spectral efficiency 64QAM MCS table is via PC5-RRC configuration for sidelink unicast.

In some embodiments: The legacy 64QAM MCS table is the default MCS table for NR V2X sidelink. The usage of 256QAM MCS table or low-spectral efficiency 64QAM MCS table is via PC5-RRC configuration.

Embodiments herein discuss details on NR V2X physical layer structure. Embodiments may include the following.

In some embodiments: In sidelink TBS determination, the number of sidelink data REs is calculated by deducting overheads from the total number of REs used for sidelink transmission in a slot excluding AGC symbol and GP symbol in the end of slot. Specifically, $$N_{RE} = N_{RE}^{PSCCH/PSSCH} - N_{RE}^{PSCCH} - N_{RE}^{SCI2} - N_{RE}^{PSFCH} - N_{RE}^{PSCCH-DMRS} - N_{RE}^{PTRS} - N_{RE}^{CSI-RS}.$$

In some embodiments: In sidelink TBS determination, the PSFCH overhead $N_{RE}^{PSFCH}$ is calculated by setting the reference number of PSFCH symbols (including GP symbol before PSFCH) $N_{symbol}^{PSFCH}$ as 3 if PSFCH periodicity is 1 slot; 0 if PSFCH periodicity is 0 slot; a (pre)configured value of resource pool if PSFCH periodicity is 2 or 4 slots.

In some embodiments: In sidelink TBS determination, the second stage SCI overhead $N_{RE}^{SCI2}$ is calculated by $$N_{RE}^{SCI2} = \min\left\{\left\lceil\frac{(O_{SCI2} + L_{SCI2})\beta_{offset}^{SCI2}}{2 \cdot R}\right\rceil, \left\lceil\alpha \cdot \sum_{l=0}^{N_{symbol}^{SCI2}-1} M_{SC}^{SCI2}(l)\right\rceil\right\}$$

where the second stage SCI payload size $O_{SCI2}$ is indicated by the first stage SCI, the number of allowed second stage SCI symbols $N_{symbol}^{SCI2}$ is equal to the (pre)configured number of symbols used for sidelink in a slot minus AGC symbol, GP symbol in the end of slot, and the reference number of PSFCH symbols $N_{symbol}^{PSFCH}$, and the reference beta offset $\beta_{offset}^{SCI2}$ is (pre)configured by resource pool.

In some embodiments: In sidelink TBS determination, the PSSCH DMRS overhead $N_{RE}^{PSSCH-DMRS}$ is calculated by $\sum_{i=0}^{N_{symbol}^{PSSCH-DMRS}} N_{RE}^{PSSCH-DMRS}(i)$, where $N_{symbol}^{PSSCH-DMRS}$ is selected from (pre)configured DMRS time patterns based on $N_{symbol}^{PSFCH}$.

In some embodiments: In sidelink TBS determination, the sidelink PTRS overhead $N_{RE}^{PTRS}$ is based on the scheduled MCS and scheduled PSSCH bandwidth.

In some embodiments: In sidelink TBS determination, the sidelink CSI-RS overhead $N_{RE}^{CSI-RS}$ is only counted for sidelink unicast.

In some embodiments: For time domain resources of a resource pool, the periodicity is 10240 ms and $L_{bitmap}$ is $20 \cdot 2^\mu$.

In some embodiments: If the configured PRBs for resource pool is not a multiple of sub-channel size, then the remainder PRBs with the highest indices are not used.

In some embodiments: The scrambling sequence for first stage SCI is a gold sequence with a constant initialization value.

In some embodiments: The scrambling sequence for second stage SCI is a gold sequence with initialization value depending on PSCCH CRC. Specifically, $c_{init}=n_{RNTI}2^{15}+n_{const}$, where $n_{const}$ is a constant with value equal to PSCCH scrambling sequence initialization value, and $n_{RNTI}$ is the 16 LSB of PSCCH CRC.

In some embodiments: The scrambling sequence for data on PSSCH is a gold sequence with initialization value depending on both first stage SCI CRC and second stage SCI CRC. Specifically, $c_{init}=n_{RNTI}2^{15}+n_{const}$, where $n_{const}$ is a constant with value equal to PSCCH scrambling sequence initialization value, $n_{RNTI}$ is the XOR of 16 MSB of first stage SCI CRC and 16 LSB of second stage SCI CRC.

In some embodiments: Two second stage SCI formats are defined. The first format is used for broadcast, unicast and groupcast without feedback, groupcast HARQ option 2 and unicast with feedback. The second format is used for groupcast HARQ option 1.

In some embodiments: The size of the "second stage SCI format" field in first stage SCI is 2 bits.

In some embodiments: For the first format of second stage SCI, an additional bit is included in second stage SCI to indicate whether HARQ feedback is disabled.

In some embodiments: For the first format of second stage SCI, an additional bit is included in second stage SCI to indicate PSFCH resource determination scheme.

In some embodiments: CRC length of second stage SCI is 24 bits.

In some embodiments: Support of 256QAM by a UE from the receiver perspective is based on UE capability.

In some embodiments: The legacy 64QAM MCS table is the default MCS table for NR V2X sidelink. The usage of 256QAM MCS table or low-spectral efficiency 64QAM MCS table is via PC5-RRC configuration.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) to determine a sidelink transport block size, comprising:
   a memory to store a first stage Sidelink Control Information (SCI); and
   a baseband processor to:
   calculate a reference second stage SCI overhead using the first stage SCI;
   determine a number of resource elements for a physical sidelink shared channel (PSSCH) based at least on the reference second stage SCI overhead; and
   determine the sidelink transport block size based on the number of resource elements for the PSSCH.

2. The apparatus of claim 1, wherein the reference second stage SCI overhead is calculated by solving a reference second stage SCI formula, wherein the reference second stage SCI formula is:

$$N_{RE}^{SCI2} = \min\left\{\left\lceil\frac{(O_{SCI2} + L_{SCI2})\beta_{offset}^{SCI2}}{R*Q_m}\right\rceil, \left\lceil\alpha\sum_{l=0}^{N_{symbol}^{SCI-2}-1} M_{SC}^{SCI2}(l)\right\rceil\right\}$$

where:
$O_{SCI2}$ is a second stage SCI payload size,
$L_{SCI2}$ is a Cyclic Redundancy Check (CRC) length of a second stage SCI,
R is a coding rate,
$Q_m$ is a modulation order,
α is an alpha value,
$N_{symbol}^{SCI-2}$ is a number of symbols for potential SCI stage 2 transmissions, depending on a number of reference Physical Sidelink Feedback Channel (PSFCH) symbols,
$M_{SC}^{SCI2}(l)$ is a scheduled bandwidth of a PSSCH transmission, and
$\beta_{offset}^{SCI2}$ is a reference beta offset.

3. The apparatus of claim 1, wherein the baseband processor is further to determine a channel state information reference signal (CSI-RS) overhead using on cast type and a reference CSI-RS port number,
wherein to determine the CSI-RS overhead the baseband processor is to obtain a format of a second stage SCI from the first stage SCI,
wherein for sidelink broadcast and groupcast, the CSI-RS overhead is zero, and
wherein for sidelink unicast the CSI-RS overhead depends on the reference CSI-RS port number.

4. The apparatus of claim 1, wherein the baseband processor is further to determine a phase-tracking reference signal (PTRS) overhead using a reference modulation coding scheme (MCS) determined based on a reference coding rate and a reference modulation order, wherein a time density of the PTRS overhead depends on the reference MCS.

5. The apparatus of claim 1, wherein the baseband processor is further to determine a Physical Sidelink Feedback Channel (PSFCH) overhead using a reference PSFCH symbol number;
wherein the PSFCH overhead is a total number of resource elements allocated for PSFCH transmissions and a guard period symbol before the PSFCH transmissions, wherein the PSFCH overhead depends on configured PSFCH periodicity.

6. The apparatus of claim 1, wherein the baseband processor is further to determine a PSSCH demodulation reference signal (DMRS) overhead using a reference Physical Sidelink Feedback Channel (PSFCH) symbol number, wherein to determine the PSSCH DMRS overhead the baseband processor is to derive a reference DMRS symbol number from the reference PSFCH symbol number and preconfigured DMRS time patterns.

7. The apparatus of claim 1, wherein the baseband processor is further to calculate a physical sidelink control channel (PSCCH) overhead, wherein the PSCCH overhead is a total number of resource elements allocated for PSCCH.

8. The apparatus of claim 1, wherein the baseband processor is further to calculate an intermediate number of information bits using the number of resource elements for the PSSCH, and determine a transport block size using the intermediate number of information bits.

9. The apparatus of claim 1, wherein to calculate the number of resource elements for the PSSCH the baseband processor reduces a total number of resource elements for both PSSCH transmissions and physical sidelink control channel (PSCCH) transmissions by the reference second stage SCI overhead, a channel state information reference signal (CSI-RS) overhead, a phase-tracking reference signal (PTRS) overhead, a Physical Sidelink Feedback Channel (PSFCH) overhead, a PSSCH demodulation reference signal (DMRS) overhead, and a PSCCH overhead.

10. The apparatus of claim 1, wherein to calculate the number of resource elements for the PSSCH the baseband processor uses an equation:

$$N_{RE} = N_{RE}^{PSCCH/PSSCH} - N_{RE}^{PSCCH} - N_{RE}^{SCI2} - N_{RE}^{PSFCH} - N_{RE}^{PSCCH-DMRS} - N_{RE}^{PTRS} - N_{RE}^{CSI-RS}$$

where:
$N_{RE}^{PSCCH/PSSCH}$ is a total number resource elements allocated for physical sidelink control channel (PSCCH)/PSSCH transmissions;
$N_{RE}^{PSCCH}$ is a PSCCH overhead;
$N_{RE}^{SCI2}$ is the reference second stage SCI overhead;
$N_{RE}^{PSFCH}$ is a Physical Sidelink Feedback Channel (PSFCH) overhead;
$N_{RE}^{PSSCH-DMRS}$ is a PSSCH demodulation reference signal (DMRS) overhead;
$N_{RE}^{PTRS}$ is a phase-tracking reference signal (PTRS) overhead;
$N_{RE}^{CSI-RS}$ is a channel state information reference signal (CSI-RS) overhead.

11. A method for a user equipment (UE), comprising:
receiving a first stage Sidelink Control Information (SCI);
receiving a second stage SCI;
calculating a reference second stage SCI overhead using the first stage SCI;
determining a number of resource elements for a physical sidelink shared channel (PSSCH) based at least on the reference second stage SCI overhead; and
determining a sidelink transport block size based on the number of resource elements for the PSSCH.

12. The method of claim 11, wherein the reference second stage SCI overhead is calculated by solving a reference second stage SCI formula, wherein the reference second stage SCI formula is:

$$N_{RE}^{SCI2} = \min\left\{\left\lceil\frac{(O_{SCI2} + L_{SCI2})\beta_{offset}^{SCI2}}{R*Q_m}\right\rceil, \left\lceil\alpha\sum_{l=0}^{N_{symbol}^{SCI-2}-1} M_{SC}^{SCI2}(l)\right\rceil\right\}$$

where:
$O_{SCI2}$ is a second stage SCI payload size,
$L_{SCI2}$ is a Cyclic Redundancy Check (CRC) length of the second stage SCI,
R is a coding rate,
$Q_m$ is a modulation order,
α is an alpha value,
$N_{symbol}^{SCI-2}$ is a number of symbols for potential SCI stage 2 transmissions, depending on a number of reference Physical Sidelink Feedback Channel (PSFCH) symbols,
$M_{SC}^{SCI2}(l)$ is a scheduled bandwidth of a PSSCH transmission, and
$\beta_{offset}^{SCI2}$ is a beta offset.

13. The method of claim 11, further comprising determining a channel state information reference signal (CSI-RS) overhead using on cast type and a reference CSI-RS port number,
wherein to determining the CSI-RS overhead comprises obtaining a format of the second stage SCI from the first stage SCI and obtaining cast-type from the second stage SCI,
wherein for sidelink broadcast and groupcast, the CSI-RS overhead is zero, and
wherein for sidelink unicast the CSI-RS overhead depends on the reference CSI-RS port number.

14. The method of claim 11, further comprising determining a phase-tracking reference signal (PTRS) overhead using a reference modulation coding scheme (MCS), wherein time density of the PTRS overhead depends on the reference MCS.

15. The method of claim 11, further comprising determining a Physical Sidelink Feedback Channel (PSFCH) overhead using a reference PSFCH symbol number, wherein the PSFCH overhead is a total number of resource elements allocated for PSFCH transmissions and a guard period symbol before the PSFCH transmissions, wherein the PSFCH overhead depends on configured PSFCH periodicity.

16. A non-transitory computer-readable storage medium including instructions that when executed by a UE, cause the UE to:
receive a first stage Sidelink Control Information (SCI);
receive a second stage SCI;
calculate a reference second stage SCI overhead using the first stage SCI; and
determine a number of resource elements for a physical sidelink shared channel (PSSCH) based at least on the reference second stage SCI overhead; and
determine a sidelink transport block size based on the number of resource elements for the PSSCH.

17. The non-transitory computer-readable storage medium of claim 16, wherein the reference second stage SCI overhead is calculated by solving a reference second stage SCI formula, wherein the reference second stage SCI formula is:

$$N_{RE}^{SCI2} = \min\left\{\left\lceil\frac{(O_{SCI2} + L_{SCI2})\beta_{offset}^{SCI2}}{R * Q_m}\right\rceil, \left\lceil \alpha \sum_{l=0}^{N_{symbol}^{SCI-2}-1} M_{SC}^{SCI2}(l)\right\rceil\right\}$$

where:
$O_{SCI2}$ is a second stage SCI payload size,
$L_{SCI2}$ is a Cyclic Redundancy Check (CRC) length of the second stage SCI,
R is a coding rate,
$Q_m$ is a modulation order,
$\alpha$ is an alpha value,
$N_{symbol}^{SCI-2}$ is a number of symbols for potential SCI stage 2 transmissions, depending on a number of reference Physical Sidelink Feedback Channel (PSFCH) symbols
$M_{SC}^{SCI2}(l)$ is a scheduled bandwidth of a PSSCH transmission, and
$\beta_{offset}^{SCI2}$ is a beta offset.

* * * * *